(12) United States Patent
Ichihara et al.

(10) Patent No.: US 6,932,053 B2
(45) Date of Patent: Aug. 23, 2005

(54) CONTROL DEVICE OF INTERNAL COMBUSTION ENGINE

(75) Inventors: Hideaki Ichihara, Obu (JP); Hisashi Iida, Kariya (JP); Noriaki Ikemoto, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/991,403

(22) Filed: Nov. 19, 2004

(65) Prior Publication Data

US 2005/0109318 A1 May 26, 2005

(30) Foreign Application Priority Data

Nov. 21, 2003 (JP) .............................. 2003-392060
Jan. 21, 2004 (JP) .............................. 2004-012781

(51) Int. Cl.$^7$ ............................................. F02M 7/00
(52) U.S. Cl. ........................ 123/344; 123/349; 123/350
(58) Field of Search ........................... 123/406.45, 299, 123/344, 349, 350, 395, 406.12, 406.47, 123/406.48

(56) References Cited

U.S. PATENT DOCUMENTS 6,278,933 B1 * 8/2001 Buckland et al. ........... 701/104

FOREIGN PATENT DOCUMENTS

JP 4-308311 10/1992 ............. F01N 3/20

* cited by examiner

Primary Examiner—Bibhu Mohanty
(74) Attorney, Agent, or Firm—Nixon & Vanderhye P.C.

(57) ABSTRACT

A catalyst for purifying exhaust gas is provided in an exhaust pipe of an engine. When air-fuel ratio dither control is performed, an ECU calculates a requested torque to be generated by combustion of the engine based on an accelerator opening angle or the like operated by a driver. An MBT estimated torque corresponding to MBT (Minimum advance for the Best Torque) in each case is calculated, and a spark timing retard limit estimated torque corresponding to a spark timing retard limit in each case is calculated. An air-fuel ratio amplitude amount in the air-fuel ratio dither control is calculated based on the calculated requested torque, the MBT estimated torque, and the spark timing retard limit estimated torque. An early activation of a catalyst is realized.

26 Claims, 18 Drawing Sheets

FIG. 8A RESERVE TORQUE

FIG. 8B INDICATED TORQUE (MBT TIME TORQUE / MOST DELAYED TORQUE)

FIG. 8C FINAL TARGET λ (LEAN ↔ RICH)

FIG. 8D INDICATED TORQUE (AFTER λ EFFICIENCY CORRECTION)

FIG. 8E REQUESTED IGNITION TIMING (MBT / DELAY ANGLE LIMIT)

CONTROL DEVICE OF INTERNAL COMBUSTION ENGINE

CROSS-REFERENCE TO RELATED APPLICATION

This application is based on Japanese Patent Applications No. 2003-392060 filed on Nov. 21, 2003, and No. 2004-12781 filed on Jan. 21, 2004, the disclosures of which are incorporated herein by reference.

FIELD OF THE INVENTION

The present invention relates to a control device of an internal combustion engine.

BACKGROUND OF THE INVENTION

Conventionally, there is disclosed a technique in which a catalyst for purifying exhaust gas is installed in an exhaust pipe of an internal combustion engine. In order to activate the catalyst at an early stage immediately after the start of the internal combustion engine, a fuel injection amount is increased/decreased for every combustion, and an air-fuel ratio is oscillated between a rich side and a lean side with respect to the stoichiometric air-fuel ratio (for example, see JP-A-4-308311). That is, the air-fuel ratio is oscillated between the rich side and the lean side, so that rich combustion and lean combustion are repeated, the temperature of the catalyst is raised by oxidation reaction heat generated at that time, and the early activation of the catalyst is accelerated.

In this case, the amplitude amount of the air-fuel ratio has been determined by trial and error at the time of adjusting the internal combustion engine in view of variations of drivability due to a change in driving environment and a change in operation state of auxiliary equipment of the internal combustion engine.

However, in the existing device, since the air-fuel ratio is oscillated with the amplitude amount previously determined by the adjustment, even in the case where there is room for the amplitude of the air-fuel ratio according to the driving state of the internal combustion engine, the amplitude of the air-fuel ratio is uniquely controlled. This has been an obstruction to the realization of the early activation of the catalyst.

In addition to the object of the catalyst activation, also in a case where the response of an air-fuel ratio sensor is detected and a deterioration judgment is made from the detected response, the air-fuel ratio is oscillated between a rich side and a lean side. In such a case, it is desired to oscillate the air-fuel ratio excellently without causing the deterioration of drivability or the like.

SUMMARY OF THE INVENTION

An object of the present invention is to provide a control device of an internal combustion engine in which excellent drivability is kept and early activation of a catalyst can be realized.

According to the invention, a requested torque to be generated by combustion of an internal combustion engine is calculated based on an accelerator opening degree or the like operated by a driver. An MBT estimated torque corresponding to MBT (Minimum advance for the Best Torque) in each case, and a spark timing retard limit estimated torque corresponding to a spark timing retard limit ignition timing in each case are calculated. An air-fuel ratio amplitude amount in air-fuel ratio dither control is calculated based on the requested torque, the MBT estimated torque and the spark timing retard limit estimated torque. In this case, in the air-fuel ratio dither control, the control air-fuel ratio is oscillated with the air-fuel ratio amplitude amount between a lean side and a rich side with respect to a target base air-fuel ratio, and at that time, lean combustion and rich combustion are repeated, so that activation of a catalyst is realized.

According to this structure, the air-fuel ratio amplitude amount in the air-fuel ratio dither control is calculated based on the requested torque, the MBT estimated torque, and the spark timing retard limit estimated torque in each case. Thus, the air-fuel ratio dither control can be realized while making the most of the range in which the angle advance and the angle delay of the ignition timing in each case are possible, that is, the range in which the torque can be operated. Accordingly, for example, at the activation of the catalyst, the activation performance can be exhibited to the utmost extent. As a result, while the excellent drivability is kept, the early activation of the catalyst can be realized. In this case, as compared with the related art in which the air-fuel ratio dither control is performed with the previously determined amplitude amount, the catalyst activation performance is improved. Besides, even if the operation state of the internal combustion engine is changed, that can be handled, and accordingly, it is not necessary to adjust the air-fuel ratio amplitude amount in expectation of various conditions, and the number of adjusting steps can be reduced.

DETAILED DESCRIPTION OF EMBODIMENT

First Embodiment

Hereinafter, a first embodiment of the present invention will be described with reference to the drawings. In this embodiment, an engine control system is configured for an on-board multi-cylinder gasoline engine as an internal combustion engine. In the control system, an electronic control unit (hereinafter referred to as an ECU) is a main part, and the control of a fuel injection amount, the control of an ignition timing and the like are performed. First, the whole rough structure of the engine control system will be described with reference to FIG. 1.

Figure 1:
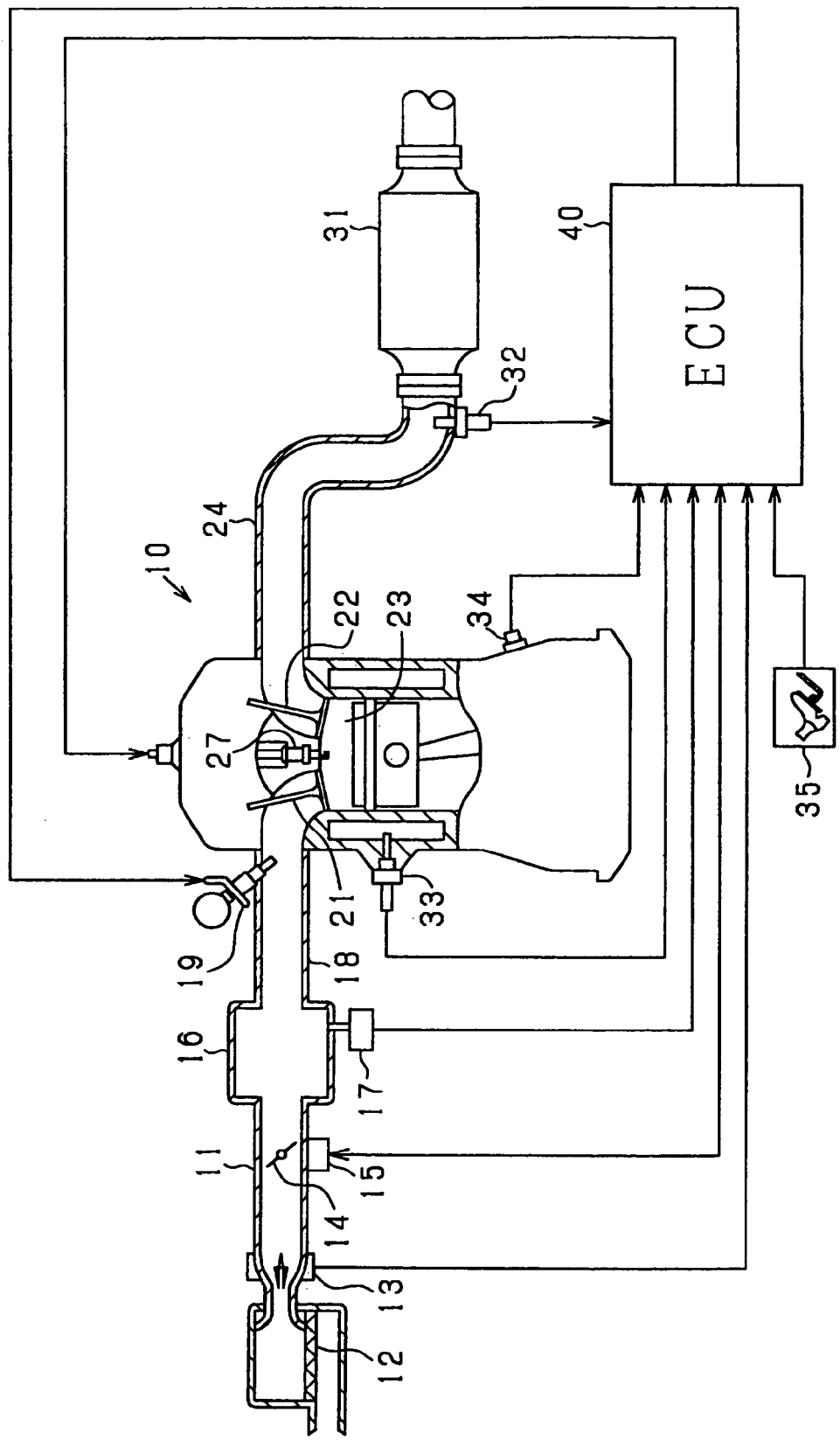
FIG. 1 is a structural view showing an outline of an engine control system of an embodiment of the invention.

In an engine 10 shown in FIG. 1, an air cleaner 12 is provided at the most upstream part of an intake pipe 11, and an air flow meter 13 for detecting an intake air amount is provided at the downstream side of the air cleaner 12. A throttle valve 14 whose opening degree is adjusted by a throttle actuator 15 such as a DC motor is provided at the downstream side of the air flow meter 13. The opening degree (throttle opening degree) of the throttle valve 14 is detected by a throttle opening degree sensor incorporated in the throttle actuator 15. A surge tank 16 is provided at the downstream side of the throttle valve 14, and an intake pipe pressure sensor 17 for detecting intake pipe pressure is provided in the surge tank 16. An intake manifold 18 for introducing air into respective cylinders of the engine 10 is connected to the surge tank 16, and in the intake manifold 18, an electromagnetic driving type fuel injection valve 19 for injecting and supplying fuel is attached in the vicinity of an intake port of each cylinder.

An intake valve 21 and an exhaust valve 22 are provided in the intake port and the exhaust port of the engine 10, respectively. A mixture of air and fuel is introduced into a combustion chamber 23 by an opening operation of the intake valve 21, and an exhaust gas after combustion is exhausted into an exhaust pipe 24 by an opening operation of the exhaust valve 22. An ignition plug 27 is attached to a cylinder head of the engine 10 for each cylinder, and a high voltage is applied to the ignition plug 27 at a desired ignition timing through a not-shown ignition device (igniter) made of an ignition coil and the like. A spark discharge is generated between opposing electrodes of the ignition plug 27 by the application of the high voltage, and the mixture introduced into the combustion chamber 23 is ignited and is burned.

A catalyst 31 such as a three-way catalyst for purifying CO, HC, NOx and the like in the exhaust gas is provided in the exhaust pipe 24. An air-fuel ratio sensor 32 ($O_2$ sensor, linear A/F sensor, etc.) whose detection object is the exhaust gas and which detects the air-fuel ratio of the mixture is provided at the upstream side of the catalyst 31. A cooling water temperature sensor 33 for detecting the temperature of cool water and a crank angle sensor 34 for outputting a rectangular crank angle signal at every specified crank angle (for example, 30°CA period) of the engine 10 is attached to the cylinder block of the engine 10. In addition, an accelerator sensor 35 for detecting the depressing amount of a gas pedal (accelerator opening degree) is provided.

The outputs of the foregoing various sensors are inputted to an ECU 40 for performing engine control. The ECU 40 is mainly constructed of a well-known microcomputer including a CPU, a ROM, a RAM and the like, and executes various control programs stored in the ROM, so that fuel injection amount control, ignition timing control, air amount control and the like are performed according to the engine driving state. Especially, immediately after an engine start, in order to realize early activation of the catalyst 31, air-fuel ratio dither control to oscillate the target air-fuel ratio between the lean side and the rich side is performed.

Figure 2:
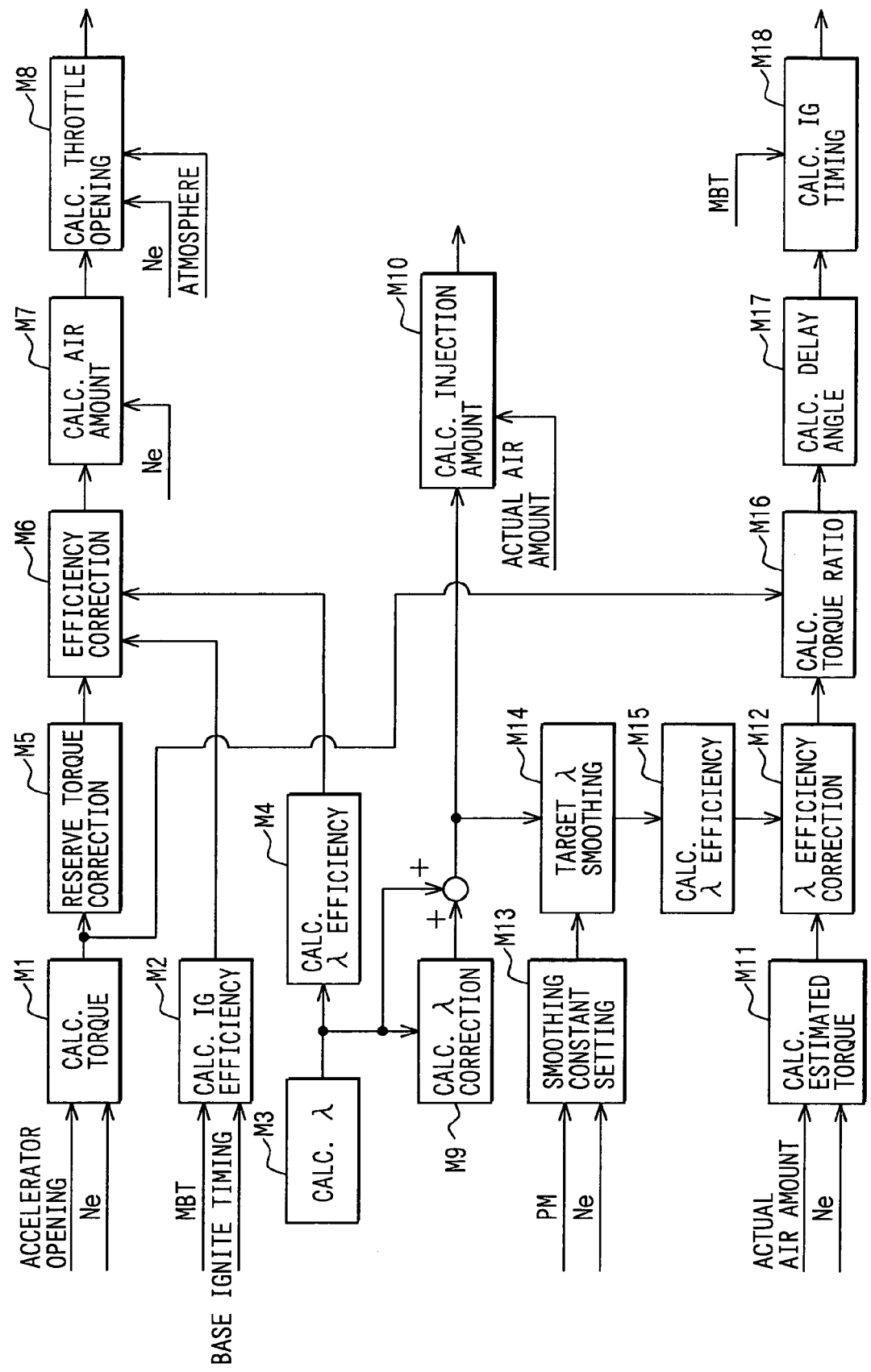
FIG. 2 is a functional block diagram of an ECU.

FIG. 2 is a functional block diagram showing various operations realized by the ECU 40, which are classified by function, and the respective functional blocks will be described in sequence. Incidentally, in the following description, the air-fuel ratio is denoted by $\lambda$ (excess air coefficient).

In FIG. 2, a requested indicated torque calculation unit M1 calculates a requested indicated torque requested from a driver by an accelerator operation. In detail, the requested indicated torque calculation unit M1 calculates a base value of a requested engine torque requested from the driver based on the output (accelerator opening degree) of the accelerator sensor 35, engine rotation speed Ne, and the like and by a map, a mathematical expression or the like. Further an ISC corrected torque and the like are added to calculate a final requested engine torque. Then, a loss torque is added to the requested engine torque to calculate the requested indicated torque. Here, the loss torque includes an inner loss torque by mechanical friction loss and pumping loss.

An ignition timing efficiency calculation unit M2 calculates an ignition timing efficiency of a base ignition timing relative to MBT (Minimum advance for the Best Torque). The ignition timing efficiency corresponds to a torque efficiency expressing the influence of an ignition timing on a torque. At this time, the ignition timing efficiency is calculated by using an ignition timing efficiency characteristic shown in FIG. 5. According to FIG. 5, the ignition timing efficient is 1.0 in the case of MBT=base ignition timing (that is, a delay amount= 0), and as the base ignition timing is more delayed relative to the MBT, the value calculated as the ignition timing efficiency becomes small. The base ignition timing is suitably calculated based on an engine operation condition (engine rotation speed Ne, load, etc.) in each case.

Figure 3:
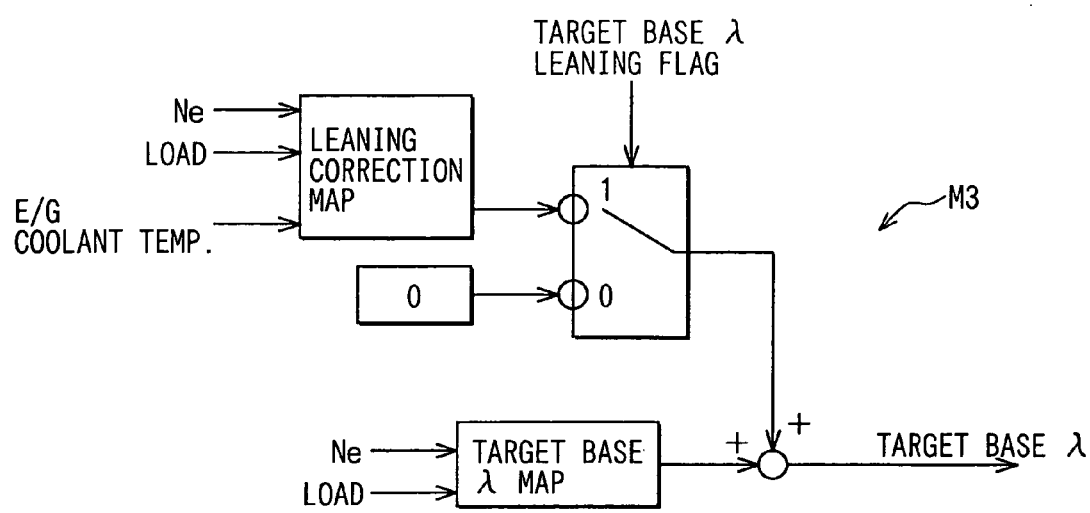
FIG. 3 is a functional block diagram showing the details of a target base λ calculation unit.

A target base $\lambda$ calculation unit M3 calculates a target $\lambda$ base (target base air-fuel ratio) based on the engine operation condition in each case. In detail, as shown in FIG. 3, a target base $\lambda$ map (mathematical expression can also be used) is used, and the target base $\lambda$ is calculated based on the engine rotation speed Ne and the load in each case. However, at this time, leaning correction is performed on the target base $\lambda$ as the need arises, and in the case where the leaning correction is performed, what is obtained after the correction is performed is finally made the target base $\lambda$. For example, immediately after the engine start and at the time of the start of the air-fuel ratio dither control, a target base $\lambda$ leaning flag is made 1, and together with this flag operation, the leaning correction value is added to the target base $\lambda$. The leaning correction value is calculated by using, for example, a leaning correction value map (mathematical expression can also be used) and based on the engine rotation speed Ne, load, and engine water temperature in each case. When the target base $\lambda$ leaning flag is 0, the leaning correction value is 0, and the leaning correction is not performed. By this, for example, in the case where the target base $\lambda$ (map value) is the stoichiometric air-fuel ratio (λ=1.0) or a value in the vicinity thereof, the target base λ is corrected to the lean side.

A λ efficiency calculation unit M4 calculates a λ efficiency according to the target base λ in each case. The λ efficiency corresponds to the torque efficiency in which λ denotes an influence on a torque. At this time, the λ efficiency is calculated by using a λ efficiency characteristic shown in FIG. 6. According to FIG. 6, the λ efficiency=1.0 is established in the case of λ=1.0, and at the rich side with respect to λ=1.0, the λ efficiency is once raised and is lowered, while at the lean side, the λ efficiency is lowered almost linearly.

A torque increase correction unit M5 adds a reserve torque to the requested indicated torque calculated by the requested indicated torque calculation unit M1. By the torque increase correction unit M5, a requested indicated torque larger than what is actually requested by the driver is set. An efficiency correction unit M6 performs correction by ignition timing efficiency and λ efficiency on the requested indicated torque after the addition of the reserve torque. By the efficiency correction, the suitable requested indicated torque corresponding to the ignition timing and λ in each case can be calculated.

A requested air amount calculation unit M7 calculates a requested air amount while the requested indicated torque after the efficiency correction by the efficiency correction unit M6 and the engine rotation speed Ne are made parameters. A requested throttle opening degree calculation unit M8 calculates a requested throttle opening degree while the requested air amount, the engine rotation speed Ne and the atmospheric pressure are made parameters. Here, the intake pipe pressure is measured by the intake pipe pressure sensor 17 at the time of switching of the ignition switch OFF→ON or at the time of full throttle, and the atmospheric pressure is updated by the measured value. The driving of the throttle actuator 15 is controlled by the requested throttle opening degree, and the air amount control is realized in which the intake air amount is made coincident with the requested air amount.

A λ correction amount calculation unit M9 calculates a λ correction amount (air-fuel ratio amplitude amount) for oscillating the target base λ between the rich side and the lean side in the air-fuel ratio dither control immediately after the engine start. However, the details thereof will be described later. The λ correction amount calculated by the λ correction amount calculation unit M9 is added to the target base λ, so that the final target λ is calculated.

A requested injection amount calculation unit M10 calculates a requested injection amount based on the calculated final target λ and the actual air amount calculated from the output of the air flow meter 13. The driving of the fuel injection valve 19 is controlled by the requested injection amount.

An estimated indicated torque calculation unit M11 calculates an estimated indicated torque (actual torque) based on the actual air amount and the engine rotation speed Ne and by a map, a mathematical expression or the like. At this time, the estimated indicated torque is calculated while the MBT is made the base ignition timing.

A λ efficiency correction unit M12 corrects the estimated indicated torque, which was calculated by the estimated indicated torque calculation unit M11, by the λ efficiency based on the final target λ in each case. Here, the calculation of the λ efficiency based on the final target λ will be described in detail. A smoothing constant setting unit M13 sets a smoothing constant K based on the intake pipe pressure PM and the engine rotation speed Ne in each case and by a map, a mathematical expression or the like. A target λ smoothing unit M14 uses a smoothing operation expression set forth below, and performs a smoothing processing on the final target λ. Incidentally, IN denotes input (final target λ) of the target λ smoothing unit M14, and OUT denotes output of the target λ smoothing unit M14.

OUT($i$)=IN($i$)+K*(OUT($i$-1)-IN($i$))

By the above smoothing operation, the behavior of the actual λ relative to the final target λ can be estimated.

Figure 6:
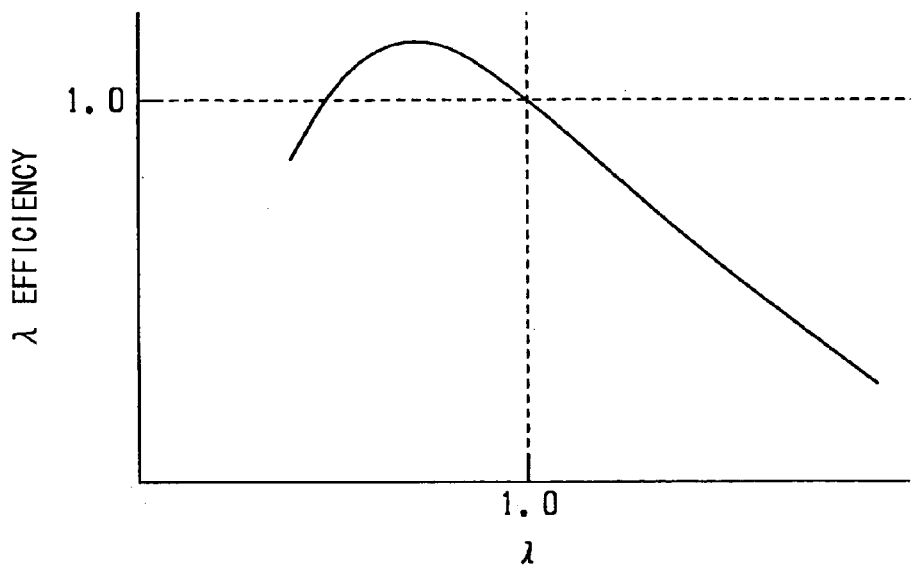
FIG. 6 is a view showing a λ efficiency characteristic.

Besides, a λ efficiency calculation unit M15 calculates the λ efficiency while the final target λ (estimated actual λ) after the smoothing operation is made a parameter. In the λ efficiency calculation, similarly to the above, the λ efficiency characteristic of FIG. 6 is used. Then, the λ efficiency correction unit M12 uses the calculated λ efficiency, and corrects the estimated indicated torque calculated by the estimated indicated torque calculation unit M11.

A torque ratio calculation unit M16 calculates a torque ratio of the estimated indicated torque after the λ efficiency correction to the requested indicated torque calculated by the requested indicated torque calculation unit M1 (torque ratio= requested indicated torque/estimated indicated torque).

Figure 5:
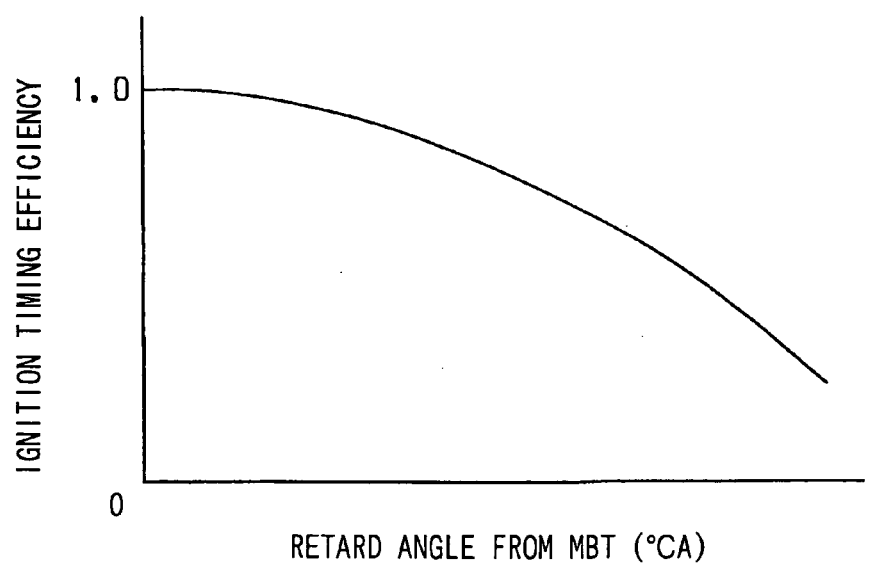
FIG. 5 is a view showing an ignition timing efficiency characteristic.

A requested spark timing retard amount calculation unit M17 uses the ignition timing efficiency characteristic of FIG. 5, and calculates a requested spark timing retard amount based on the calculated torque ratio (=requested indicated torque/estimated indicated torque). That is, the torque ratio has the same meaning as the torque efficiency, and in the case of the requested indicated torque<the estimated indicated torque, in order to reduce the torque, the requested spark timing retard amount is calculated based on the torque ratio. A request ignition timing calculation unit M18 adds the requested spark timing retard amount to the MBT and calculates a request ignition timing. A not-shown ignition device is driven by the requested ignition timing, and a spark discharge on the mixture is produced.

Incidentally, in the structure of FIG. 2, the requested indicated torque calculation unit M1 corresponds to "requested torque calculation means". The torque increase correction unit M5 corresponds to "air amount correction means". The requested air amount calculation unit M7 and the requested throttle opening degree calculation unit M8 corresponds to "air amount control means". The estimated indicated torque calculation unit M11 corresponds to "actual torque estimation means". The λ efficiency correction unit M12 corresponds to "actual torque correction means". The target λ smoothing unit M14 corresponds to "actual air-fuel ratio estimation means", and the requested spark timing retard amount calculation unit M17 and the requested ignition timing calculation unit M18 correspond to "ignition timing control means".

Next, the details of the λ correction amount calculation unit M9 will be described with reference to a functional block diagram of FIG. 4.

An MBT time torque calculation unit M21 calculates an estimated indicated torque at the time of an MBT operation (hereinafter, this will be referred to as an MBT time torque). Specifically, the λ efficiency correction is performed on the estimated indicated torque (estimated indicated torque in the case where the MBT is made the base ignition timing) calculated by the estimated indicated torque calculation unit M11, and the estimated indicated torque after the λ efficiency correction is made the MBT time torque. The λ efficiency correction is performed by multiplying the estimated indicated torque by the λ efficiency (see FIG. 6) calculated according to the target base λ in each case.

A most delayed angle time torque calculation unit M22 calculates an estimated indicated torque at the time of a most delayed angle operation (hereinafter, this will be referred to as a most delayed angle time torque). Specifically, an ignition timing efficiency correction at the time of the most delayed angle is performed on the MBT time torque calculated by the MBT time torque calculation unit M21, and the estimated indicated torque after the ignition timing efficiency correction is made the most delayed angle time torque. The ignition timing efficiency correction at the time of the most delayed angle is performed by multiplying the MBT time torque by the ignition timing efficiency (see FIG. 5) at the time of the most delayed angle with respect to the MBT.

An MBT time torque ratio calculation unit M23 calculates a torque ratio of the MBT time torque to the requested indicated torque (hereinafter, this will be referred to as an MBT time torque ratio) (MBT time torque ratio=requested indicated torque/MBT time torque). A most delayed angle time torque ratio calculation unit M24 calculates a torque ratio of the most delayed angle time torque to the requested indicated torque (hereinafter, this will be referred to as a most delayed angle time torque ratio) (most delayed angle time torque ratio=requested indicated torque/most delayed angle time torque).

An MBT-time lean λ calculation unit M25 uses the efficiency characteristic of FIG. 6, and calculates an MBT time λ lean based on the calculated MBT time torque ratio (=requested indicated torque/MBT time torque). That is, in FIG. 6, the MBT time torque ratio is made the λ efficiency, and a λ value corresponding to the MBT time torque ratio is made the MBT time lean λ.

A most delayed angle time rich λ calculation unit M26 uses the λ efficiency characteristic of FIG. 6 and calculates a most delayed angle time rich λ based on the calculated most delayed angle time torque ratio (=requested indicated torque/most delayed angle time torque). That is, in FIG. 6, the most delayed angle time torque ratio is made the λ efficiency, and a λ value corresponding to the most delayed angle time torque ratio is made the most delayed angle time rich λ.

A λ amplitude value calculation unit M27 calculates a λ amplitude value from the calculated MBT time lean λ and the most delayed angle time rich λ. In detail, a difference between the MBT time lean λ and the target base λ(MBT time lean λ-target base λ) is calculated, and further, a difference between the lean limit value and the target base λ (lean limit value-target base λ) is calculated, and a smaller one of both is selected and is made a lean side amplitude value. Besides, a difference between the most delayed angle time rich λ and the target base λ(target base λ-most delayed angle time rich λ) is calculated, and further, a difference between the rich limit value and the target base λ (target base λ-rich limit value) is calculated, and a smaller one of both is selected and is made a rich side amplitude value. Further, the lean side amplitude value and the rich side amplitude value are compared with each other, and a smaller one thereof is selected and is made a λ amplitude value. Incidentally, the lean limit value and the rich limit value are adjusted to the combustion state of the engine 10 and are previously regulated.

Figure 7:
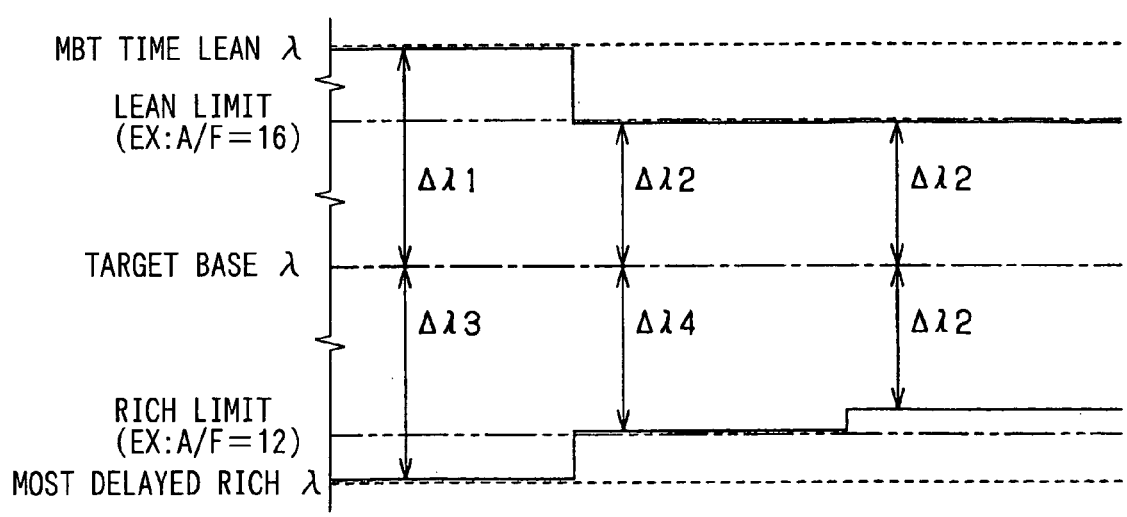
FIG. 7 is an explanatory view showing a process of calculation of a λ amplitude value.

The process of calculation of the λ amplitude value will be more specifically described with reference to FIG. 7. As one example, it is assumed that the MBT time lean λ, the most delayed angle time rich λ, the lean limit value and the rich limit value have a relation such as shown in the drawing with respect to the target base λ. In such a case, a difference Δλ1 (=MBT time lean λ-target base λ) between the MBT time lean λ and the target base λ, and a difference Δλ2 (=lean limit value-target base λ) between the lean limit value and the target base λ have a relation of Δλ1>Δλ2. Thus, Δλ2 is made the lean side amplitude value. Besides, a difference Δλ3 (target base λ-most delayed time rich λ) between the most delayed angle time rich λ and the target base λ, and a difference Δλ4 (target base λ-rich limit value) between the rich limit value and the target base λ have a relation of Δλ3>Δλ4. Thus, Δλ4 is made the rich side amplitude value. Further, because of the lean side amplitude value (Δλ2)<the rich side amplitude value (Δλ4), the lean side amplitude value (Δλ2) is made the λ amplitude value.

Figure 4:
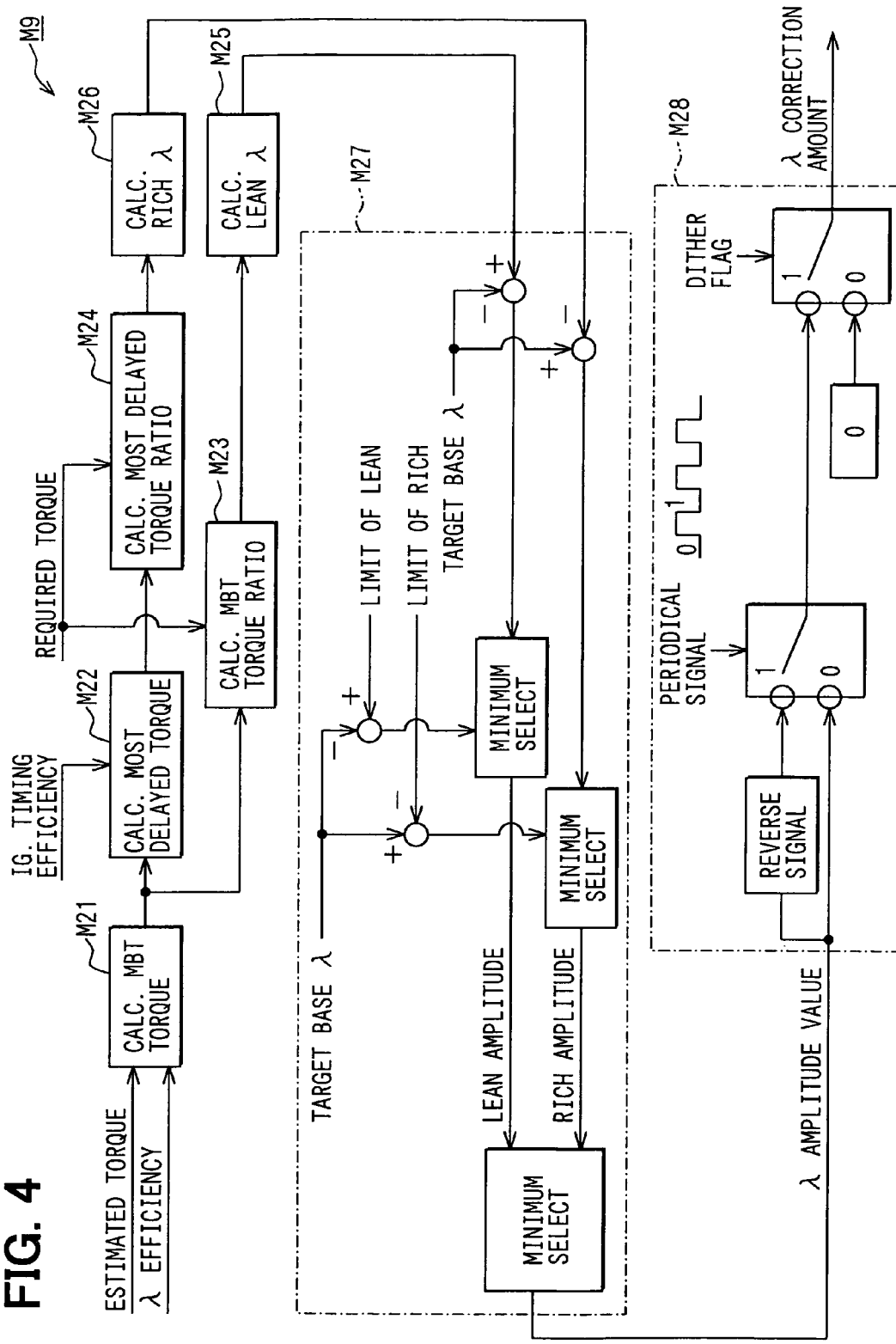
FIG. 4 is a functional block diagram showing the details of a λ correction amount calculation unit.

A return is made to the description of FIG. 4, the amplitude operation unit M28 calculates a λ correction amount to be added to the target base λ based on the calculated λ amplitude value. In detail, the calculated amplitude value and a value obtained by inverting the sign of the λ amplitude value are alternatively switched in accordance with a periodic signal. At this time, the periodic signal is a binary signal switched between 0 and 1 for every combustion. In this way, the λ amplitude value (the plus sign value or the minus sign value of the same λ amplitude value) which is switched in accordance with the periodic signal is outputted as the λ correction amount under the condition that the dither control execution condition flag is 1.

Incidentally, in the structure of FIG. 4, the MBT time torque calculation unit M21 corresponds to "MBT estimated torque calculation means", the most delayed angle time torque calculation unit M22 corresponds to "spark timing retard limit estimation torque calculation means", and the λ amplitude value calculation unit M27 corresponds to "air-fuel ratio amplitude amount calculation means". Besides, the MBT time torque in this embodiment corresponds to "MBT estimated torque", the most delayed angle time torque corresponds to "spark timing retard limit estimated torque", the MBT time lean λ corresponds to "MBT lean air-fuel ratio", and the most delayed angle time rich λ corresponds to "spark timing retard limit rich air-fuel ratio".

Figure 8:
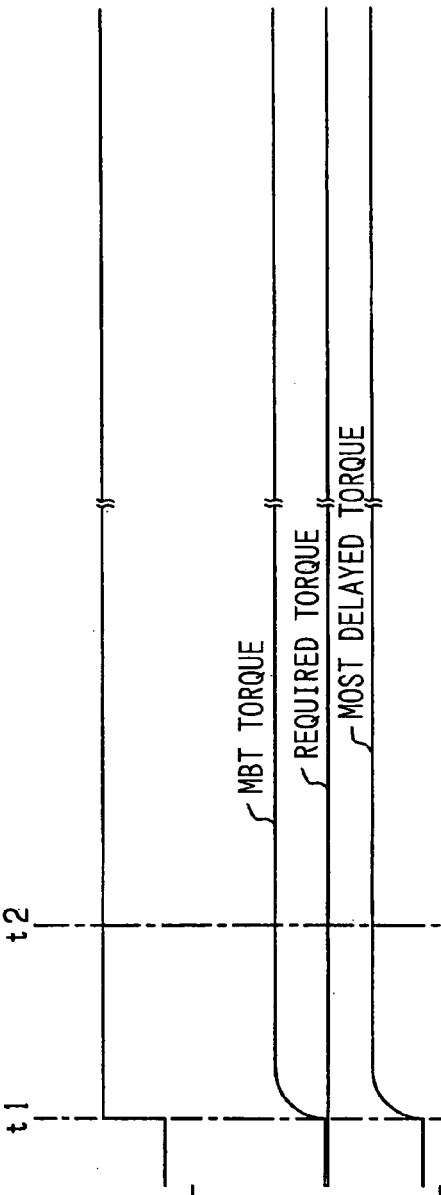
FIGS. 8A to 8E are time charts showing behaviors in air-fuel ratio dither control.

FIGS. 8A to 8E are time charts showing behaviors of the air-fuel ratio dither control. The air-fuel ratio dither control is performed for a specified period (for example, about 15 to 20 seconds) after the start of the engine 10. In FIGS. 8A to 8E, FIG. 8A shows the change of the reserve torque. FIG. 8B shows the change of the MBT time torque and the most delayed angle time torque with respect to the requested indicated torque. FIG. 8C shows the change of the final target λ. FIG. 8D shows the change of the estimated indicated torque after the λ efficiency correction with respect to the requested indicated torque. FIG. 8E shows the change of the requested ignition timing. Incidentally, in FIG. 8C, a dotted line indicates the change of the final target λ after the smoothing operation.

At t1 immediately after the start of the engine, the reserve torque is first set, and the reserve torque is added to the requested indicated torque. By this, the requested air amount is increased, and the requested throttle opening degree is increased (illustration is omitted), and consequently, the actual air amount is increased, so that the estimated indicated torque shown in FIG. 8D is increased more than the requested indicated torque. At this time, the MBT time torque and the most delayed time torque shown in FIG. 8D are also increased. With the increase of the estimated indicated torque of FIG. 8D, the difference between the estimated indicated torque and the requested indicated torque is increased. Then, in order to remove the torque difference, the ignition timing is delayed relative to the MBT based on the torque ratio (=requested indicated torque/estimated indicated torque).

Thereafter, at t2, the air-fuel ratio dither control is started. At this time, the λ correction amount is calculated based on the requested indicated torque, the MBT time torque and the most delayed angle time torque, and the target base λ is corrected by the λ correction amount. Thus, as shown in FIG. 8C, the final target λ is oscillated between the lean side and the rich side for every combustion. At this time, it is estimated that the actual λ changes as indicated by the dotted line by the smoothing operation of the final target λ, and the estimated indicated torque is corrected as shown in FIG. 8D based on the behavior of the actual λ. Then, in accordance with the change of the estimated indicated torque shown in FIG. 8D, the requested ignition timing is controlled between the MBT and the spark timing retard limit as shown in FIG. 8E.

Figure 9:
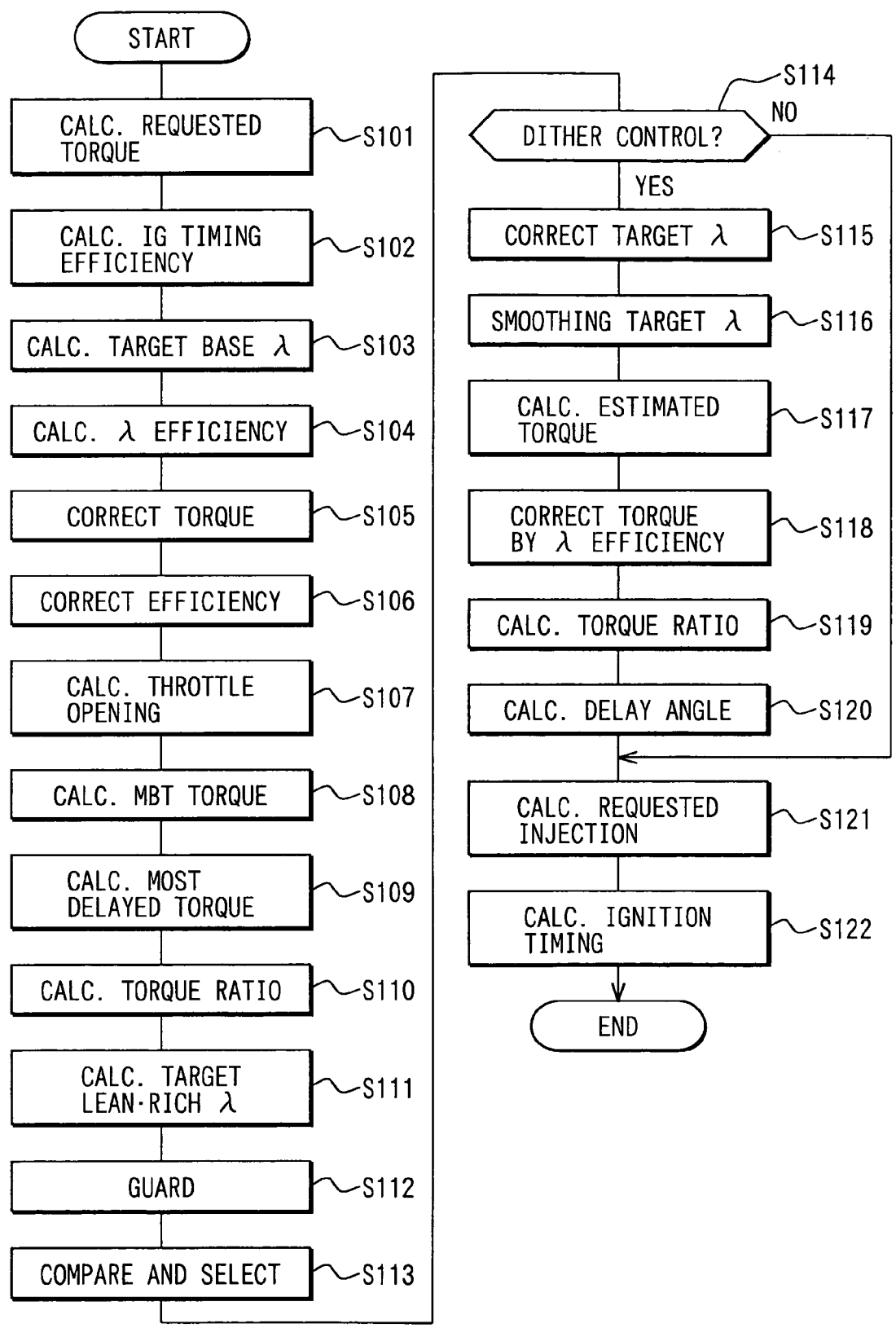
FIG. 9 is a flowchart showing a calculation processing procedure of an ECU.

FIG. 9 is a flowchart showing an operation processing procedure by the ECU 40 to realize the functional blocks of FIG. 2. Incidentally, since the processing contents at the respective steps have been already described in FIGS. 2 to 4, the details will be omitted.

In FIG. 9, first, at step S101, the requested indicated torque requested by the driver is calculated based on the accelerator opening degree, the engine rotation speed Ne and the like. At step S102, the ignition timing efficiency characteristic shown in FIG. 5 is used, and the ignition timing efficiency of the base ignition timing to the MBT is calculated. At step S103, based on the engine rotation speed Ne, the load and the like in each case, the target base λ is calculated. At step S104, the λ efficiency characteristic shown in FIG. 6 is used, and the λ efficiency is calculated according to the target base λ in each case.

At step S105, the reserve torque is added to the requested indicated torque. At step S106, the correction by the ignition timing efficiency and the λ efficiency is performed on the requested indicated torque after the addition of the reserve torque. At step S107, the requested air amount is calculated based on the requested indicated torque after the efficiency correction and the engine rotation speed Ne, and further, the requested throttle opening degree is calculated based on the requested air amount, the engine rotation speed Ne, and the atmospheric pressure.

Step S108 to step S113 correspond to the processing of calculating the λ correction amount at the time of the air-fuel ratio dither control. That is, at step S108, the estimated indicated torque at the time of the MBT operation (MBT time torque) is calculated, and at step S109, the estimated indicated torque at the time of the most delayed angle operation (most delayed angle time torque) is calculated. Thereafter, at step S110, the MBT time torque ratio is calculated from the MBT time torque and the requested indicated torque, and the most delayed angle time torque ratio is calculated from the most delayed angle time torque and the requested indicated torque. At step S111, the MBT time lean λ (target lean λ) is calculated based on the MBT time torque ratio, and the most delayed angle time rich λ (target rich λ) is calculated based on the most delayed angle time torque ratio.

At step S112, the MBT time lean λ is guarded by the lean limit value, and the most delayed angle time rich λ is guarded by the rich limit value. By this, the lean side amplitude value and the rich side amplitude value are calculated. At step S113, the lean side amplitude value and the rich side amplitude value are compared with each other, and a smaller one thereof is selected and is made the λ amplitude value.

Thereafter, at step S114, it is determined whether the execution condition of the air-fuel ratio dither control is established. For example, in the case where the engine water temperature at the engine start time is a specified temperature (for example, 40° C. or lower), or in the case where it is estimated that the catalyst 31 is in an inactive state, the execution condition is determined to be established. At the time of the establishment of the execution condition, the target base λ is corrected at step S115 by the λ amplitude value (λ correction amount), so that the final target λ is calculated. At step S116, the smoothing constant K set based on the engine operation state in each case is used, and the smoothing processing is performed on the final target λ.

At step S117, the estimated indicated torque (actual torque) is calculated based on the actual air amount and the engine rotation speed Ne, and at subsequent step S118, the estimated indicated torque is corrected by the λ efficiency based on the final target λ in each case. At step S119, the torque ratio of the estimated indicated torque after the λ efficiency correction to the requested indicated torque is calculated. At step S120, the ignition timing efficiency characteristic of FIG. 5 is used, and the requested spark timing retard amount is calculated based on the torque ratio calculated at step S119.

At step S121, the requested injection amount is calculated based on the final target λ and the actual air amount. At step S122, the requested ignition timing is calculated by the addition of the requested spark timing retard amount and the MBT.

According to the embodiment which has been described in detail, following excellent effects are obtained.

When the air-fuel ratio dither control is performed at the time of the engine start, since the λ correction amount (air-fuel ratio amplitude amount) is calculated based on the requested indicated torque, the MBT time torque, and the most delayed angle time torque in each case, the air-fuel ratio dither control can be realized while making the most of the range in which the angle advance and the angle delay of the ignition timing in each case are possible, that is, the range in which the torque can be operated. Accordingly, the catalyst activation performance can be exhibited to the utmost degree. As a result, while the excellent drivability is kept, the early activation of the catalyst 31 can be realized. In this case, as compared with the related art in which the air-fuel ratio dither control is performed with the previously determined amplitude amount, the catalyst activation performance is improved. Besides, even if the engine operation state is changed, that can be handled, and therefore, it is not necessary to adjust the air-fuel ratio amplitude amount in expectation of various conditions, and the number of adjusting steps can be reduced.

The MBT time lean λ calculated based on the ratio of the requested indicated torque to the MBT time torque is guarded by the lean limit value, so that the lean side amplitude value is calculated. The most delayed angle time rich λ calculated based on the torque ratio of the requested indicated torque to the most delayed angle time torque is guarded by the rich limit value, so that the rich side amplitude value is calculated. Thus, the λ amplitude is not performed to excess the lean limit value or the rich limit value. Accordingly, the air-fuel ratio dither control can be performed without causing the deterioration of a combustion state, the deterioration of an exhaust emission, and the like. The deterioration of drivability can also be suppressed.

Since the λ amplitude value common to the lean side and the rich side is calculated based on one of the lean side amplitude value and the rich side amplitude value closer to the target base λ, the λ amplitude is performed with the equal width at the lean side and the rich side with respect to the target base λ. Therefore, the deterioration of the exhaustion emission can be suppressed.

In the structure of this embodiment, the requested air amount is forcibly increased by increasing the requested indicated torque by addition of the reserve torque, and consequently, the ignition timing is delayed. Thus, the ignition timing can be adjusted without causing a torque variation against the request. That is, it is possible to secure room for the operation of the ignition timing. Accordingly, in the air-fuel ratio dither control, it becomes possible to keep the torque as requested by the adjustment of the ignition timing, and the drivability can be kept excellent.

Besides, in the structure, the final target λ is smoothed according to the engine operation state in each case, so that the behavior of the actual λ at the time of the air-fuel ratio dither control is estimated, and the estimated indicated torque is corrected based on the estimated actual λ. Thus, a shift between the final target λ and the actual λ can be removed, and the high accuracy torque control can be realized. For example, even in the case where a shift occurs between the final target λ and the actual λ by the port wet, the λ shift by the port wet is predicted from the engine operation state, so that the torque control reflecting the λ shift can be realized.

Second Embodiment

In this embodiment, in order to improve the controllability of air-fuel ratio dither control, under a condition that individual cylinder air-fuel ratios are uniformed, that is, variations in air-fuel ratios between cylinders are removed, the practice of the air-fuel ratio dither control is permitted. In the following, a description will be given mainly to a difference from the first embodiment, and common members are denoted by the same numbers and their description will be simplified.

Figure 10:
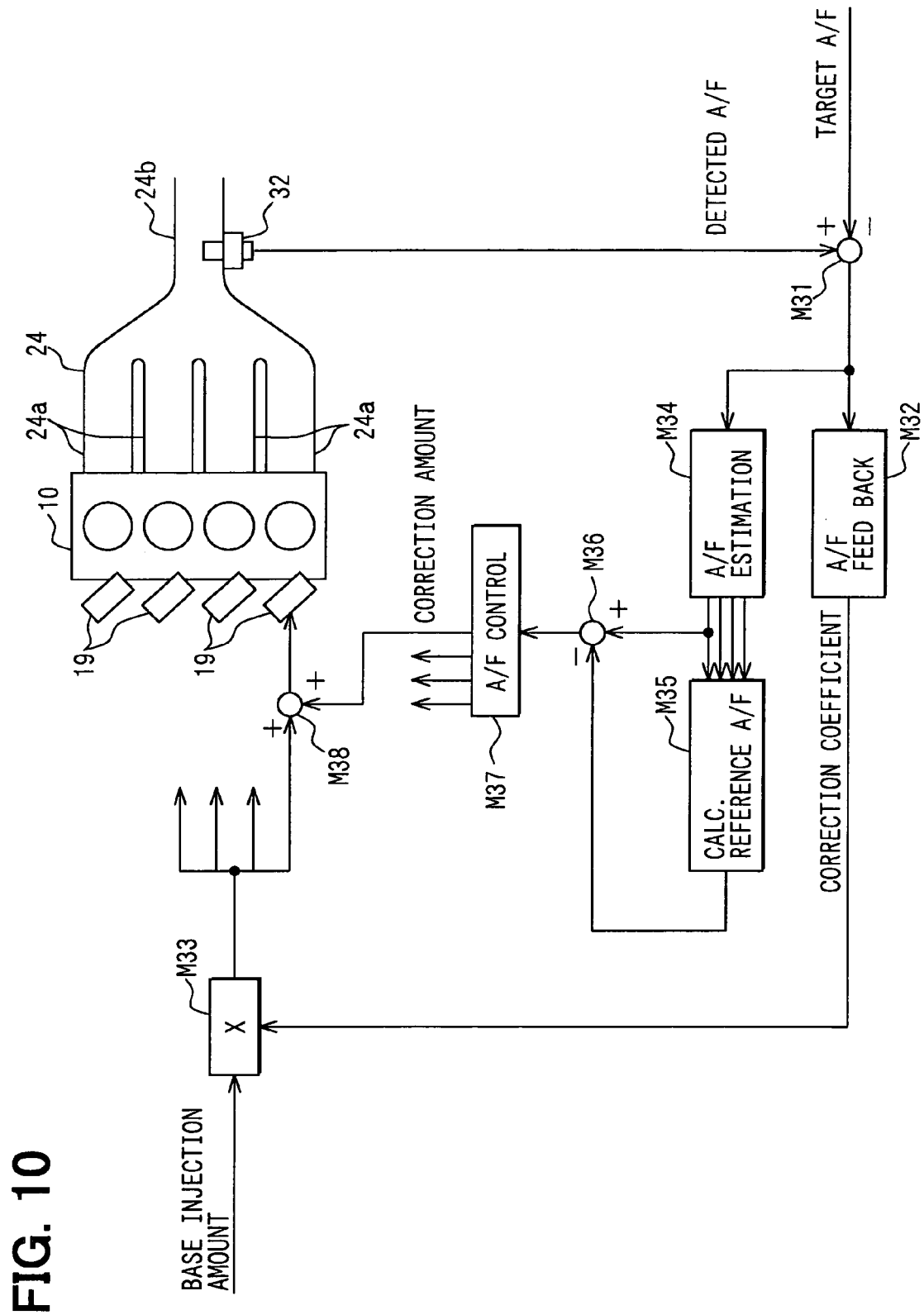
FIG. 10 is a schematic view showing a structure concerning air-fuel ratio F/B control in a second embodiment.

FIG. 10 is a schematic view showing a main structure in this embodiment. In FIG. 10, an engine 10 is a four-cylinder engine. An exhaust pipe 24 includes manifold parts 24a connected to respective cylinders, and an exhaust collection part 24b in which the respective manifold parts 24a are collected. An air-fuel ratio sensor (A/F sensor) 32 is provided in the exhaust collection part 24b.

Besides, FIG. 10 shows individual functional blocks in a structure relating to air-fuel ratio F/B (feedback) control, and the outline of the air-fuel ratio F/B control will be described. An air-fuel ratio deviation calculation part M31 calculates a deviation between a detected air-fuel ratio calculated from a detection signal of the air-fuel ratio sensor 32 and a separately set target air-fuel ratio. The air-fuel ratio F/B control part M32 calculates an air-fuel ratio correction coefficient based on the deviation. An injection amount calculation part M33 calculates a final injection amount from a base injection amount calculated based on engine rotation speed, engine load (for example, intake pipe negative load) and the like, the air-fuel ratio correction coefficient, and the like. Basically, a fuel injection valve 11 is controlled by the final injection amount of the injection amount calculation part M33. The flow of the control is the same as conventional air-fuel ratio F/B control.

In the foregoing air-fuel ratio F/B control, the fuel injection amount (air-fuel ratio) of each cylinder is controlled based on the air-fuel ratio information detected by the exhaust collection part 24b of the exhaust pipe 24. However, since the air-fuel ratio actually varies for each cylinder, in this embodiment, an individual cylinder air-fuel ratio is obtained from the detected value of the air-fuel ratio sensor 32, and the individual cylinder air-fuel ratio control is performed based on the individual cylinder air-fuel ratio. The details will be described below.

The air-fuel ratio deviation calculated by the air-fuel ratio deviation calculation part M31 is inputted to an individual cylinder air-fuel ratio estimation part M34, and the individual cylinder air-fuel ratio estimation part M34 estimates an individual cylinder air-fuel ratio. At this time, the individual cylinder air-fuel ratio estimation part M34 forms a model. The model is on the assumption that the detected value of the air-fuel ratio sensor 32 is obtained by multiplying the history of the individual cylinder air-fuel ratio of inflow gas in the exhaust collection part 24b and the history of the detected value of the air-fuel ratio sensor 32 by specified weights respectively and by adding them. The individual cylinder air-fuel ratio is estimated based on the model. A Kalman filter is used as an observer.

More specifically, the model of the gas exchange in the exhaust collection part 24b is approximated by a following expression (1). In the expression (1), ys denotes a detected value of the air-fuel ratio sensor 32, u denotes an air-fuel ratio of gas flowing into the exhaust collection part 24b, and k1 to k4 denote constants.

$$y_s(t)=k1*u(t-1)+k2*u(t-2)-k3*y_s(t-1)-k4*y_s(t-2) \quad (1)$$

In the exhaust system, there are a primary delay element of gas inflow and mixture in the exhaust collection part 24b and a primary delay element by the response of the air-fuel ratio sensor 32. Then, in the expression (1), these delay elements are taken into consideration, and reference is made to the past two histories.

When the expression (1) is converted into a state space model, a following expression (2) is obtained. In the expression (2), A, B, C and D denote parameters of the model, Y denotes a detected value of the air-fuel ratio sensor 32, X denotes an individual cylinder air-fuel ratio as a state variable, and W denotes a noise.

$$X(t+1)=AX(t)+Bu(t)+W(t)$$
$$y(t)=CX(t)+Du(t) \quad (2)$$

Further, when the Kalman filter is designed by the expression (2), a following expression (3) is obtained. In the expression (3), X^ (X-hat) denotes an individual cylinder air-fuel ratio as an estimated value, and K denotes a Kalman gain. The notation of X^ (k+1|k) denotes that an estimated value at time k+1 is obtained by an estimated value at time k.

$$X(k+1|k)=AX(k|k-1)+K(Y(k)-CAX(k|k-1)) \quad (3)$$

As described above, the individual cylinder air-fuel ratio estimation part M34 is configured by the Kalman filter type observer, so that the individual cylinder air-fuel ratio can be sequentially estimated with the advance of the combustion cycle. Incidentally, in the structure of FIG. 10, the air-fuel ratio deviation is made the input of the individual cylinder air-fuel ratio estimation part M34, and in the expression (3), the output Y is replaced by the air-fuel ratio deviation.

A reference air-fuel ratio calculation part M35 calculates a reference air-fuel ratio based on the individual cylinder air-fuel ratio estimated by the individual cylinder air-fuel ratio estimation part M34. Here, an average of individual cylinder air-fuel ratios of all the cylinders (average value of the first to fourth cylinders in this embodiment) is made the reference air-fuel ratio, and each time a new individual cylinder air-fuel ratio is calculated, the reference air-fuel ratio is updated. An individual cylinder air-fuel ratio deviation calculation part M36 calculates a deviation (individual cylinder air-fuel ratio deviation) between the individual cylinder air-fuel ratio and the reference air-fuel ratio.

An individual cylinder air-fuel ratio control part M37 calculates an individual cylinder correction amount based on the deviation calculated by the individual cylinder air-fuel ratio deviation calculation part M36, and corrects the final injection amount of each cylinder by the individual cylinder correction amount. The more detailed structure of the individual cylinder air-fuel ratio control part M37 will be described with reference to FIG. 11.

Figure 11:
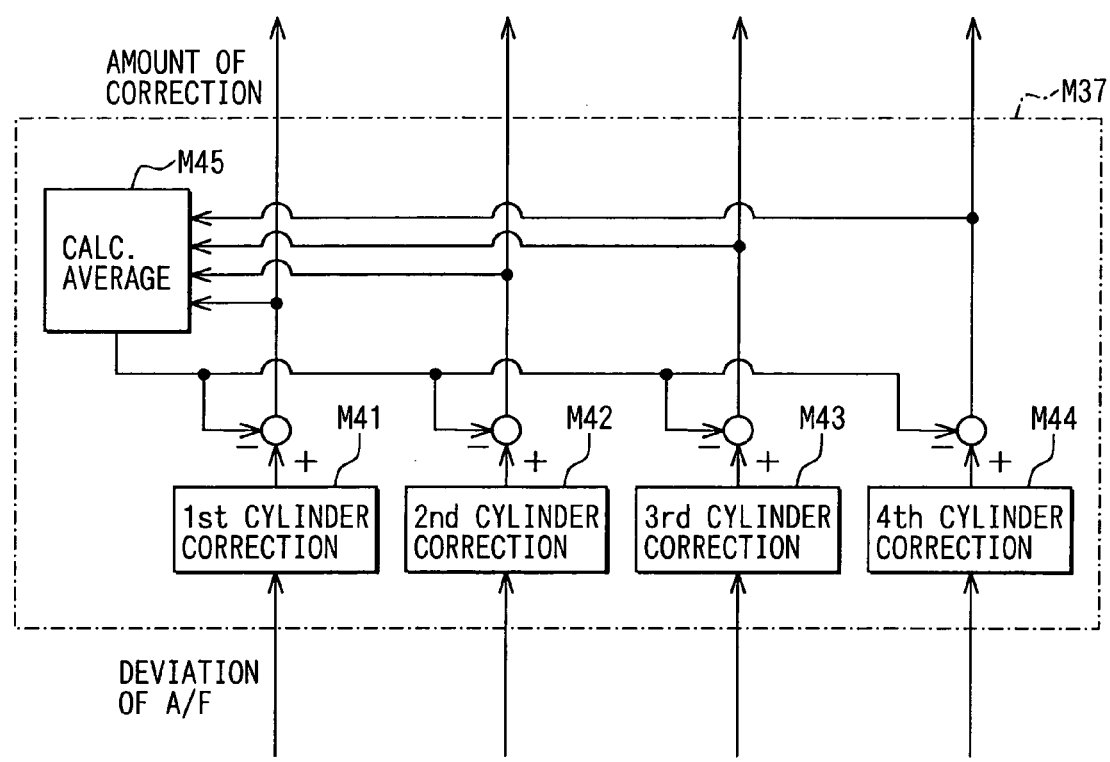
FIG. 11 is a block diagram showing a structure of an individual cylinder air-fuel ratio control part.

In FIG. 11, the individual cylinder air-fuel ratio deviations (output of the individual cylinder air-fuel ratio deviation calculation part M36 of FIG. 10) calculated for the respective cylinders are respectively inputted to correction amount calculation parts M41, M42, M43 and M44 of the first to the fourth cylinders. The respective correction amount calculation parts M41 to M44 calculate the individual cylinder correction amounts based on the individual cylinder air-fuel-ratio deviations so that the air-fuel ratio variations among the cylinders are removed, that is, the individual cylinder air-fuel ratio of the pertinent cylinder coincides with the reference air-fuel ratio. At this time, all of the individual cylinder correction amounts calculated by the correction amount calculation parts M41 to M44 of the respective cylinders are captured by a correction amount average value calculation part M45, and an average value of the respective individual cylinder correction amounts of the first cylinder to the fourth cylinder is calculated. The respective individual cylinder correction amounts of the first cylinder to the fourth cylinder are corrected to be decreased with the correction amount average value. As a result, the final injection amounts of the respective cylinders are corrected with the individual cylinder correction amount after the correction.

Figure 12:
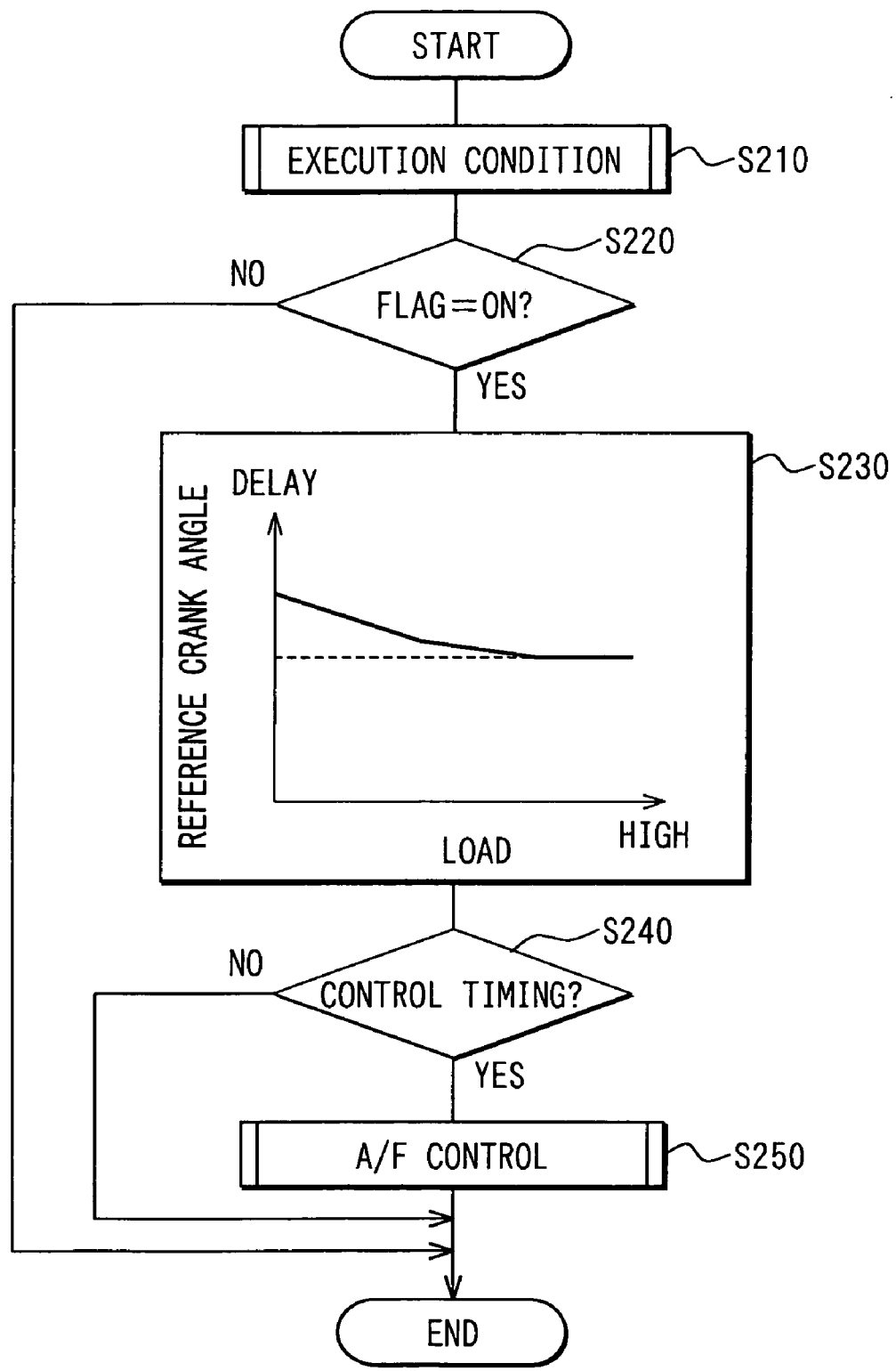
FIG. 12 is a flowchart showing a crank angle synchronization routine.

The air-fuel ratio deviation calculation part M31, the air-fuel ratio F/B control part M32, the injection amount calculation part M33, the individual cylinder air-fuel ratio estimation part M34, the reference air-fuel ratio calculation part M35, the individual cylinder air-fuel ratio deviation calculation part M36, and the individual cylinder air-fuel ratio control part M37 may be realized by a microcomputer in the ECU 40. Next, a series of flows of the individual cylinder air-fuel ratio control by the ECU 40 will be described with reference to flowcharts. FIG. 12 is a flowchart showing a crank angle synchronous routine executed at every specified crank angle (every 30°CA in this embodiment).

In FIG. 12, first, at step S210, an execution condition judgment processing for permitting or inhibiting the individual cylinder air-fuel ratio control is performed. The execution condition judgment processing will be described in detail with reference to FIG. 13. At step S211, it is determined whether the air-fuel ratio sensor 32 is in a usable state. Specifically, it is determined whether the air-fuel ratio sensor 32 is activated, or does not fail. When step S211 is YES, the procedure proceeds to step S212. Incidentally, that engine water temperature is a specified temperature (for example, minus 10° C.) or higher can also be added as a condition (condition under which the procedure proceeds to step S212).

At step S212, reference is made to an operation area map in which a rotation speed and an engine load (for example, intake pipe negative pressure) are parameters, and it is determined whether the present engine operation state is in a specified execution area. At this time, in a high revolution area or a low load area, since it is conceivable that the estimation of the individual cylinder air-fuel ratio is difficult, or the reliability of the estimated value is low, the individual cylinder air-fuel ratio control is inhibited in such an operation area, and the execution area is set as shown in the drawing.

When the present engine operation state is in the execution area, the judgment at step S213 is affirmative, and an execution flag is set at step S214. If it is not in the execution area, the judgment at step S213 is negative, and the execution flag is cleared at step S215. Thereafter, this processing is ended.

A return is made to FIG. 12, and at step S220, it is determined whether the execution flag is ON, and under the condition that the execution flag is ON, the procedure proceeds to step S230. At step S230, the control timing of the individual cylinder air-fuel ratio is determined. At this time, reference is made to a map in which an engine load (for example, intake pipe negative pressure) is made a parameter, and a reference crank angle is determined according to the engine load at that time. On the map, the reference crank angle is shifted to a spark timing retard side in a low load area. That is, in the low load area, it is conceivable that the exhaust flow rate becomes low, and therefore, the reference crank angle is set in accordance with the delay, and the control timing is determined based on the reference crank angle.

Figure 17:
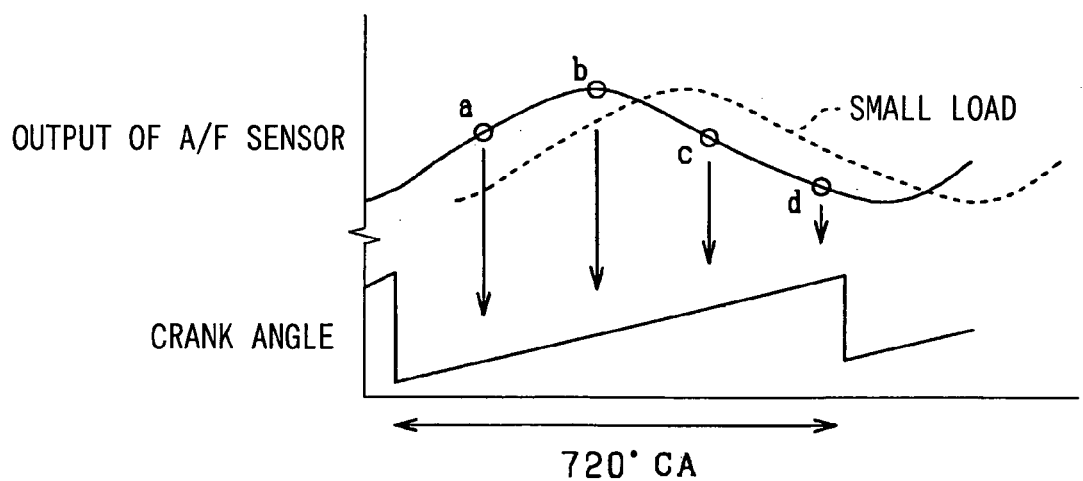
FIG. 17 is a time chart showing a relation between an air-fuel ratio sensor value and a crank angle.

Here, the reference crank angle is the reference angle position at which the air-fuel ratio sensor value used for the estimation of the individual cylinder air-fuel ratio is required, and this varies according to the engine load. With reference to FIG. 17, the air-fuel ratio sensor value varies by the individual difference among the cylinders, and becomes a specified pattern synchronous with the crank angle. The variation pattern is shifted to the spark timing retard side in the case where the engine load is small. For example, in the case where the air-fuel ratio sensor value is desired to be acquired at respective timings of a, b, c and d of FIG. 17, when the load variation occurs, the air-fuel ratio sensor value shifts from the originally desired value. However, since the reference crank angle is variably set as described above, the air-fuel ratio sensor value can be acquired at the optimum timing. However, capture (for example, A/D conversion) itself of the air-fuel ratio sensor value is not necessarily limited to the timing of the reference crank angle, and it may be performed at intervals shorter than the reference crank angle.

Thereafter, under the condition of the control timing (step S240 is YES) of the individual cylinder air-fuel ratio, the procedure proceeds to step S250, and the individual cylinder air-fuel ratio control is executed. The individual cylinder air-fuel ratio control will be described with reference to FIG. 14.

Figure 14:
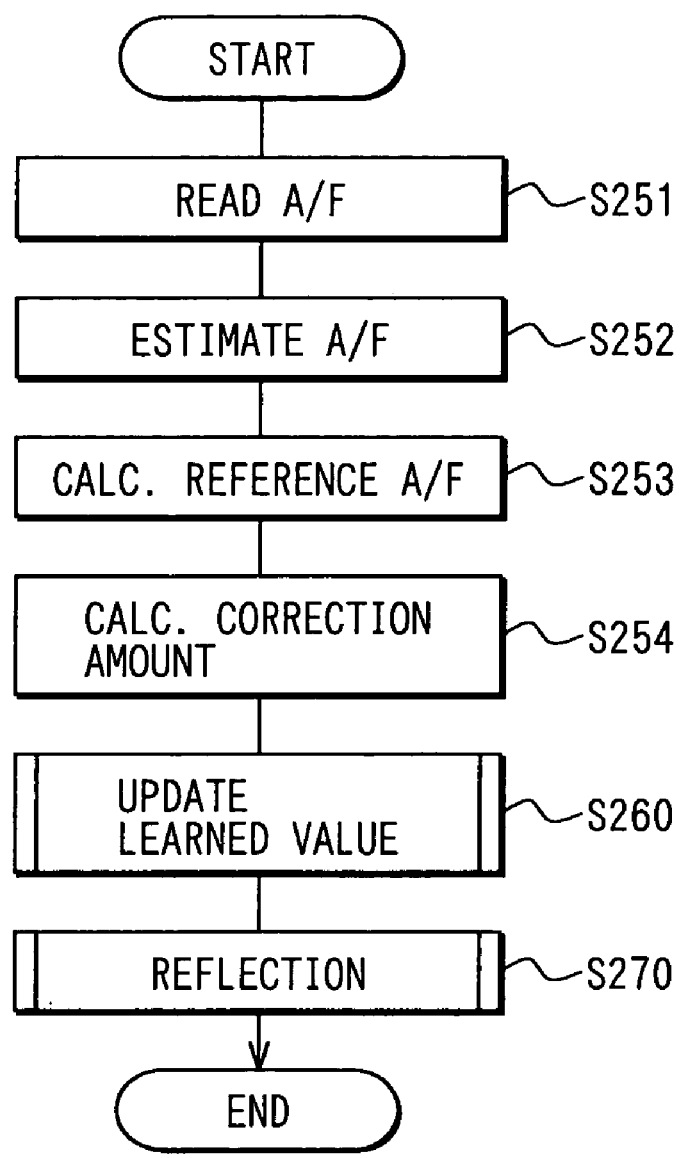
FIG. 14 is a flowchart showing an individual cylinder air-fuel ratio control processing.

In FIG. 14, at step S251, the air-fuel ratio calculated from the detection signal of the air-fuel ratio sensor 32 is read, and at subsequent step S252, the individual cylinder air-fuel ratio is estimated based on the read air-fuel ratio. The estimation method of the individual cylinder air-fuel ratio is as described before.

Thereafter, at step S253, an average value of the estimated individual cylinder air-fuel ratios of all the cylinders (those of the past four cylinders in this embodiment) is calculated, and the average value is made the reference air-fuel ratio. At step S254, the individual cylinder correction amount is calculated for each of the cylinders in accordance with the difference between the individual cylinder air-fuel ratio and the reference air-fuel ratio. Incidentally, at this time, as described in FIG. 11, the individual cylinder correction amounts of all the cylinders are respectively calculated, the average value of all the cylinders is calculated, and the value obtained by subtracting the average value of all the cylinders from the individual cylinder correction amount is finally made the individual cylinder correction amount.

Thereafter, at step S260, an update processing of an individual cylinder learning value is performed. Here, the individual cylinder learning value is the air-fuel ratio learning value obtained by learning the air-fuel ratio variations among the cylinders, and the individual cylinder learning value is stored in a backup memory such as a standby RAM for holding the storage contents also after the ignition is turned OFF. Incidentally, as the backup memory, a nonvolatile memory such as an EEPROM can also be used. However, the details of step S260 will be described later. At subsequent step S270, the individual cylinder learning value and the like are made to be reflected, and the final fuel injection amount is calculated for each cylinder. The details of step S270 will also be described later.

Figure 15:
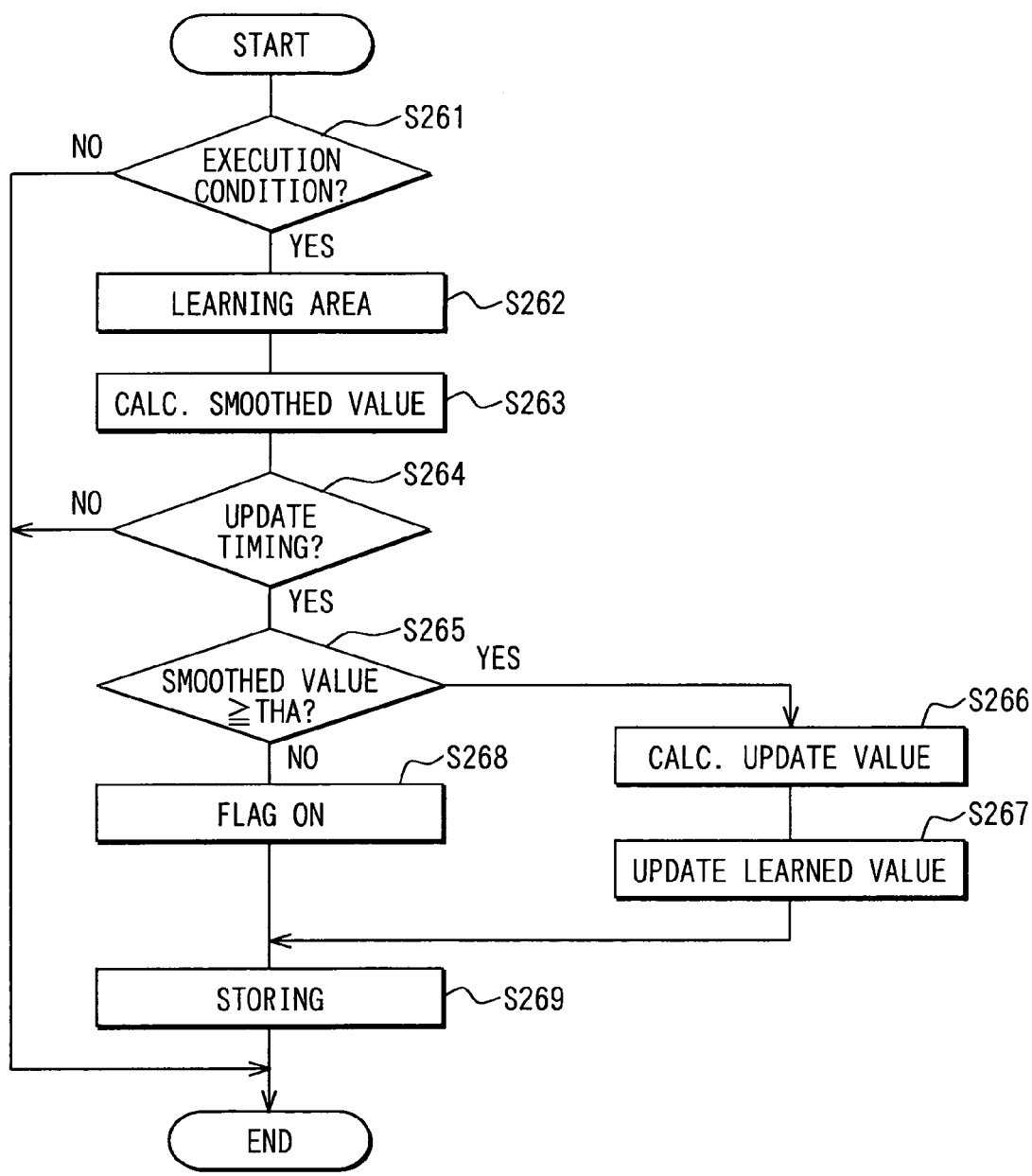
FIG. 15 is a flowchart showing an update processing of an individual cylinder learning value.

FIG. 15 is a flowchart showing the update processing of the individual cylinder learning value at step S260. In FIG. 15, at step S261, it is determined whether the execution condition of learning is established. Specifically, conditions of
(a) at present, the individual cylinder air-fuel ratio control is performed,
(b) the engine water temperature is a specified temperature or higher (for example, minus 10° C. or higher), and
(c) the air-fuel ratio variation amount is a specified value or less, and the air-fuel ratio stable condition is established, constitute a learning execution condition, and in the case where all the conditions of (a) to (c) are satisfied, it is determined that the learning execution condition is established. In the case where the learning execution condition is established, the learning value update is permitted, and in the case where the learning execution condition is not established, the learning value update is prohibited.

Figure 13:
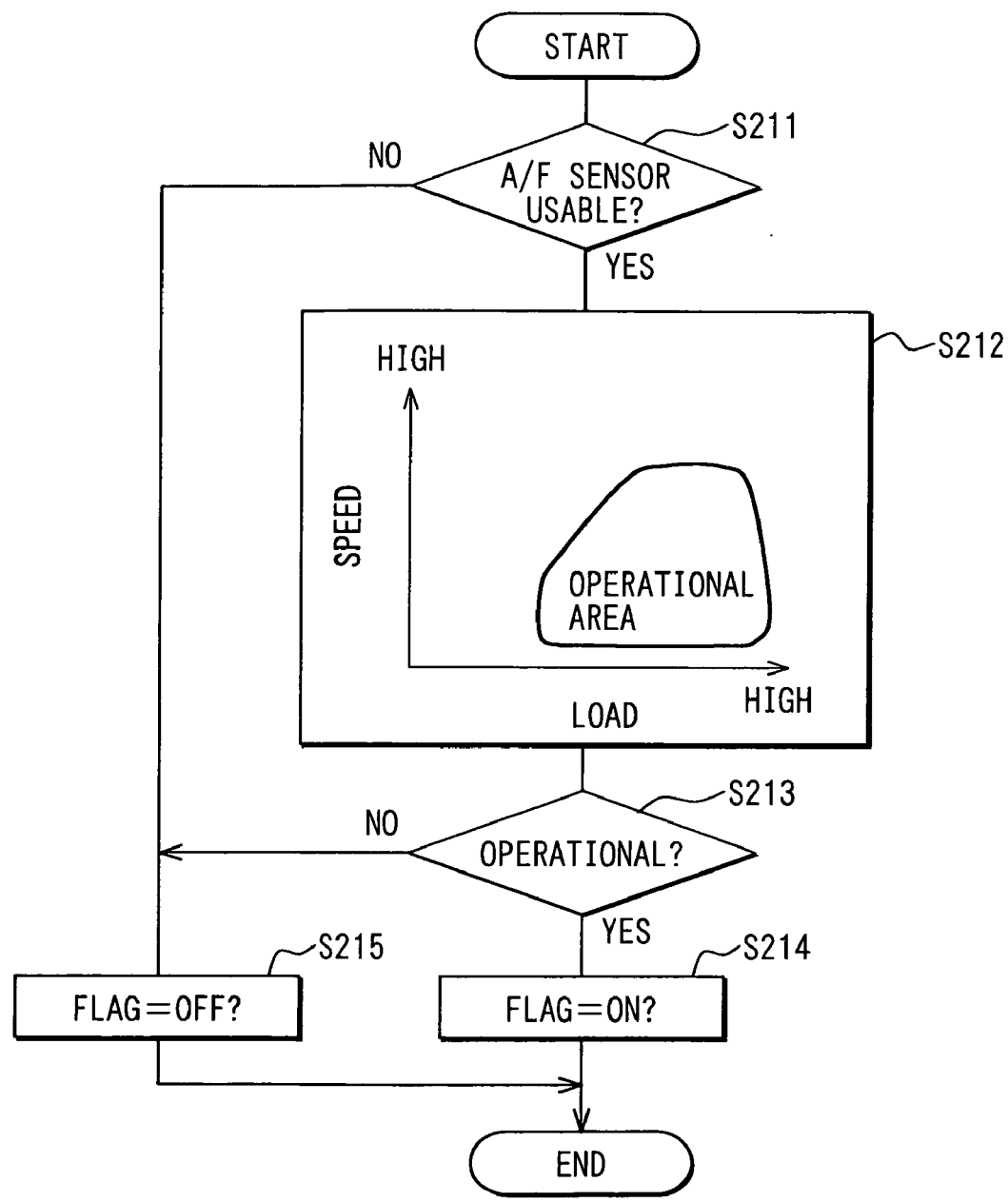
FIG. 13 is a flowchart showing an execution condition determination processing.

In order to satisfy the condition (b), it is premised that the execution condition of the individual cylinder air-fuel ratio control is established, and as described in the execution condition judgment processing of FIG. 13, the condition (a) includes conditions that the air-fuel ratio sensor 32 is activated, and it does not fail (break).

Figure 18:
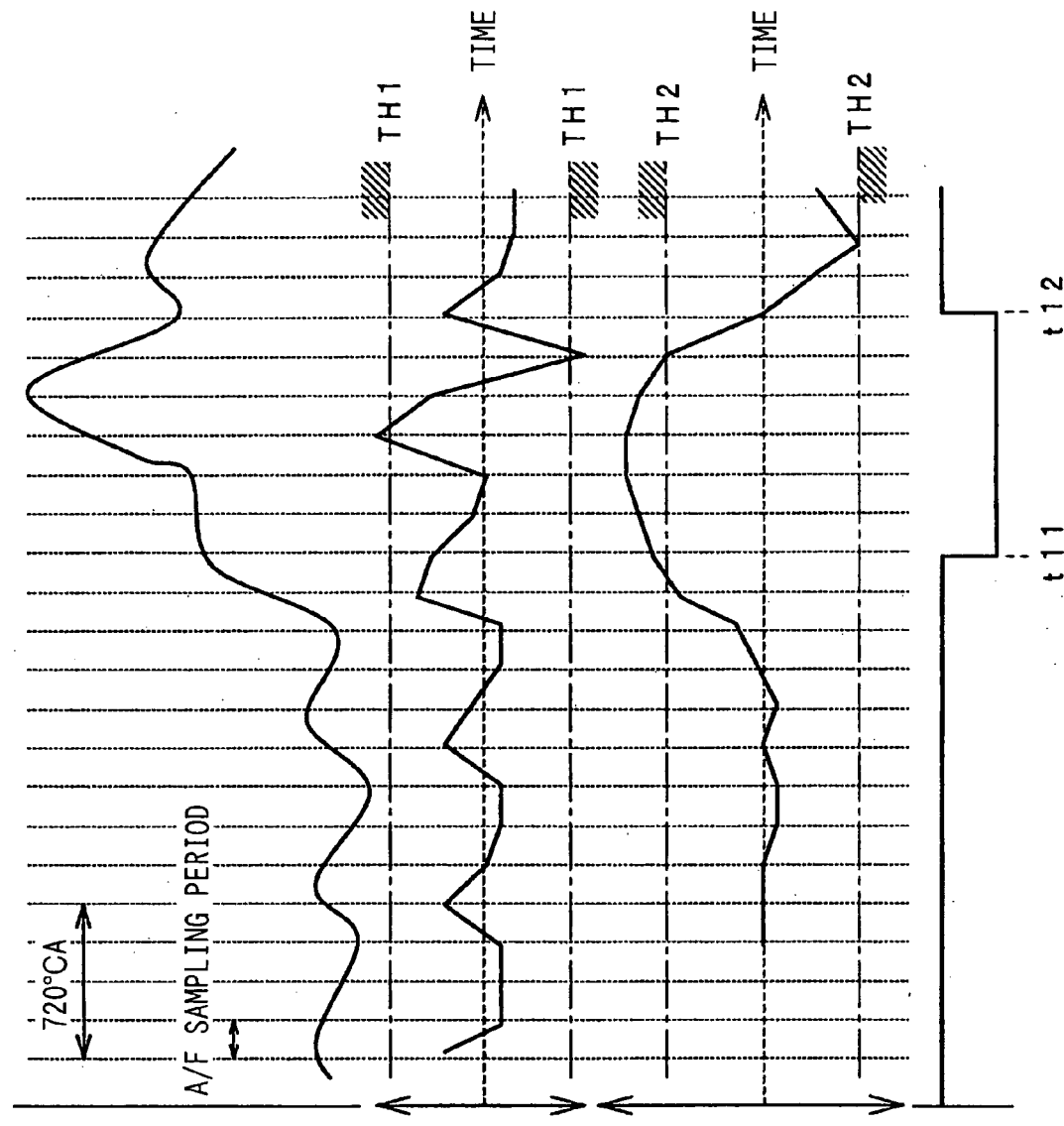
FIGS. 18A to 18D are time charts for explaining determination standards of an air-fuel ratio stable condition.

The condition (c) will be described with reference to FIG. 18. That is, in the case where a difference $\Delta A/F1$ (absolute value) between the current value of the detection air-fuel ratio (A/F) and the last value is less than a specified value TH1, and a difference $\Delta A/F2$ (absolute value) between the current value of the detection air-fuel ratio and the value 720°CA before is less than a specified value TH2, it is determined that the air-fuel ratio stable condition (c) is established. For example, when the detection air-fuel ratio is changed as shown in FIG. 18A, $\Delta A/F1$ and $\Delta A/F2$ become as shown in FIGS. 18B and 18C, and as a result, it is determined that the air-fuel ratio stable condition is established in a period other than t11 to t12.

In addition to the conditions (a) to (c), like the time of high rotation speed or the time of low load, conditions under which it is conceivable that the estimation accuracy of the individual cylinder air-fuel ratio is lowered are set, and the learning value update may be prohibited under such conditions. When the learning execution condition is regulated as described above, it becomes possible to prevent erroneous learning of the individual cylinder learning value.

In the case where the learning execution condition is established, the procedure proceeds to step S262, and for example, the engine rotation speed and the load are made parameters, and a learning area in which learning is performed this time is determined. Thereafter, at step S263, a smoothed value of the individual cylinder correction amount is calculated for each of the cylinders. Specifically, the correction amount smoothed value is calculated by using a following expression. Where, K denotes a smoothing coefficient, and for example, K=0.25. Correction amount smoothed value=last smoothed value+K×(current correction amount−last smoothed value).

Thereafter, at step S264, it is determined whether or not the current processing is the update timing of the individual cylinder learning value. The update timing may be any timing as long as the update period of the individual cylinder learning value is set to become larger than at least the calculation period of the individual cylinder correction amount, and for example, when a specified time set by a timer or the like has passed, it is determined that the update timing occurs. When the update timing of the individual cylinder learning value occurs, the procedure proceeds to subsequent step S265, while the update timing does not occur, this processing is ended.

At step S265, it is determined whether the absolute value of the calculated correction amount smoothed value for each cylinder is a specified value THA or more. In this embodiment, the specified value THA is a value in a case where a difference between an average value of individual cylinder air-fuel ratios (estimated values) of all the cylinders and the individual cylinder air-fuel ratio is 0.01 or more in excess air coefficient $\lambda$.

Figure 19:
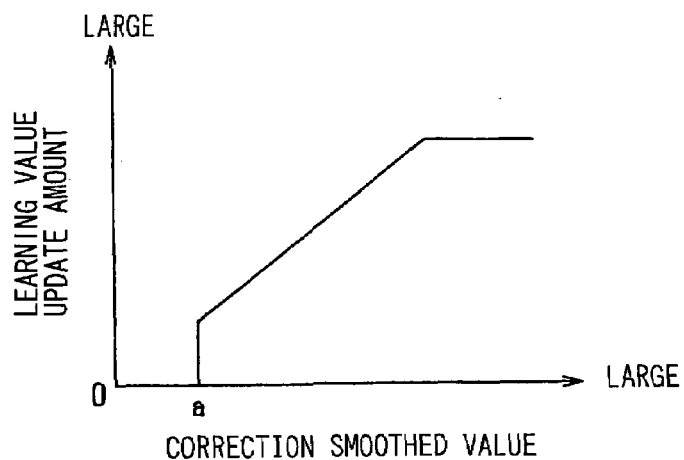
FIG. 19 is a view showing a relation between a correction amount smoothed value and a learning value update amount.

In the case of the correction amount smoothed value (absolute value)$\geq$THA, the procedure proceeds to step S266, and a learning value update amount is calculated. At this time, for example, the relation of FIG. 19 is used, and the learning value update amount is calculated based on the correction amount smoothed value at that time, and basically, as the correction amount smoothed value becomes large, the learning value update amount becomes larger. Incidentally, in the relation of FIG. 19, in the case of the correction smoothed value<a, the learning value update amount is made 0, and "a" corresponds to the specified value THA of the above-mentioned step S265. Thereafter, at step S267, an update processing of the individual cylinder learning value is performed. That is, the learning value update amount is added to the last value of the individual cylinder learning value, and the result is made a new individual cylinder learning value.

In the case of the correction amount smoothed value (absolute value)<THA, the procedure proceeds to step S268, and a learning completion flag is set.

Figure 20:
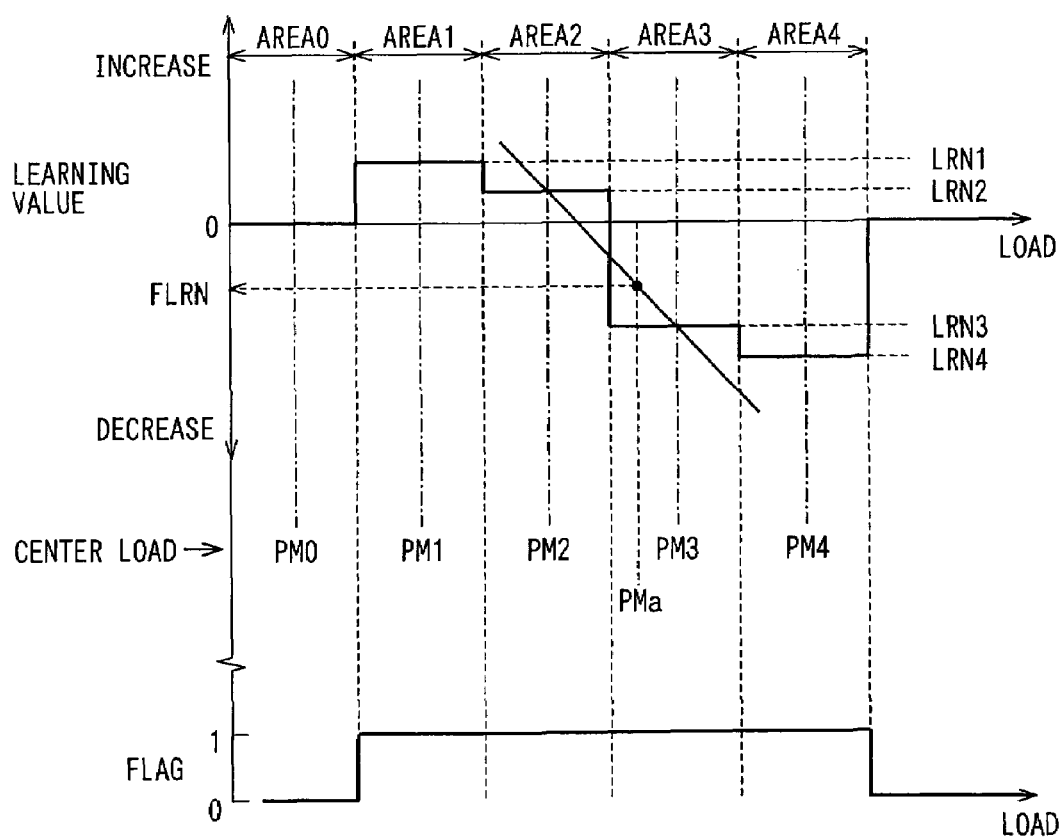
FIG. 20 is a view for explaining a storage mode of an individual cylinder learning value and a learning completion flag.

Finally, at step S269, the individual cylinder learning value and the learning completion flag are stored in the standby RAM. At this time, the individual cylinder learning value and the learning completion flag are stored for each of plural divided driving areas. The outline is shown in FIG. 20. In FIG. 20, an engine operation area is divided into an area 0, an area 1, an area 2, an area 3, and an area 4 according to load level (for example, intake pipe pressure PM), and the individual cylinder learning value and the learning completion flag are stored for each of the areas 0 to 4. The area 0 is in a state where learning is not completed, the areas 1 to 4 are in a state where leaning is completed, and the individual cylinder learning values of the areas 1 to 4 are made LRN1, LRN2, LRN3 and LRN4, respectively. Besides, the area center loads of the respective areas 0 to 4, that is, the loads typifying the respective areas are made PM0, PM1, PM2, PM3 and PM4. For the area division, in addition to the load, engine rotation speed, water temperature, intake air amount, requested injection amount or the like can be suitably used.

Figure 16:
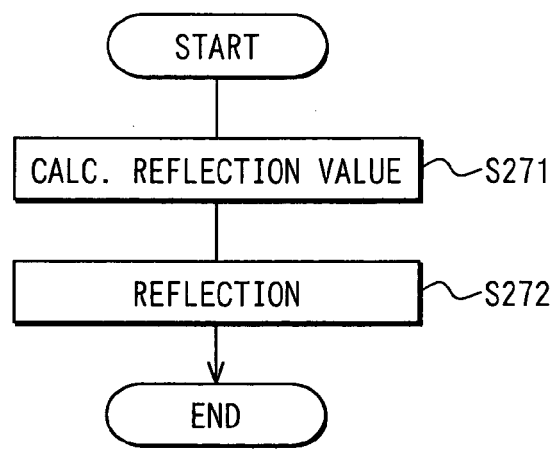
FIG. 16 is a flowchart showing a reflection processing of an individual cylinder learning value.

FIG. 16 is a flowchart showing the reflecting processing of the individual cylinder learning value at step S270. In FIG. 16, at step S271, a learning reflection value is calculated based on the engine operation state at that time. At this time, the learning reflection value is obtained by using the individual cylinder learning values stored in the respective operation areas as shown in FIG. 20 and by linear interpolation of the individual cylinder learning values among the areas. The way of obtaining the learning reflection value will be described with reference to FIG. 20.

As an example, in the case where the load at that time is PMa, the learning reflection value FLRN is calculated by using the individual cylinder learning values LRN2 and LRN3 of the areas 2 and 3 and the center loads PM2 and PM3 of the areas 2 and 3 and by a following expression (4).

$$FLRN=\{(PM3-PMa)/(PM3-PM2)\}\times LRN3+ \{(PMa-PM2)/(PM3-PM2)\}\times LRN2 \qquad (4)$$

Incidentally, in an area outside of the previously set area (learning non-execution area), it is appropriate that the learning reflection value is calculated by using the individual cylinder learning value corresponding to the area boundary part. For example, in FIG. 20, when the areas 0 to 4 are the learning execution areas, and the outside thereof is the learning non-execution area, the individual cylinder learning values of the areas 0 and 4 are used and the learning reflection value of the learning non-execution area is calculated. By this, for example, even in the learning non-execution area such as a high revolution and high load area, the reflection of the individual cylinder learning value becomes possible.

At step S272, the calculated learning reflection value is reflected on the final fuel injection amount TAU. Specifically, a basic injection amount TP, an air-fuel ratio correction coefficient FAF, an individual cylinder correction amount FK, a learning reflection value FLRN, and the other correction coefficient FALL are used, and the fuel injection amount TAU is calculated (TAU=TP×FAF×FK×FLRN×FALL). At this time, it is appropriate that the air-fuel ratio correction coefficient FAF is corrected to be decreased by the learning reflection value FLRN so that the FAF correction and the learning correction do not interfere with each other.

Figure 21:
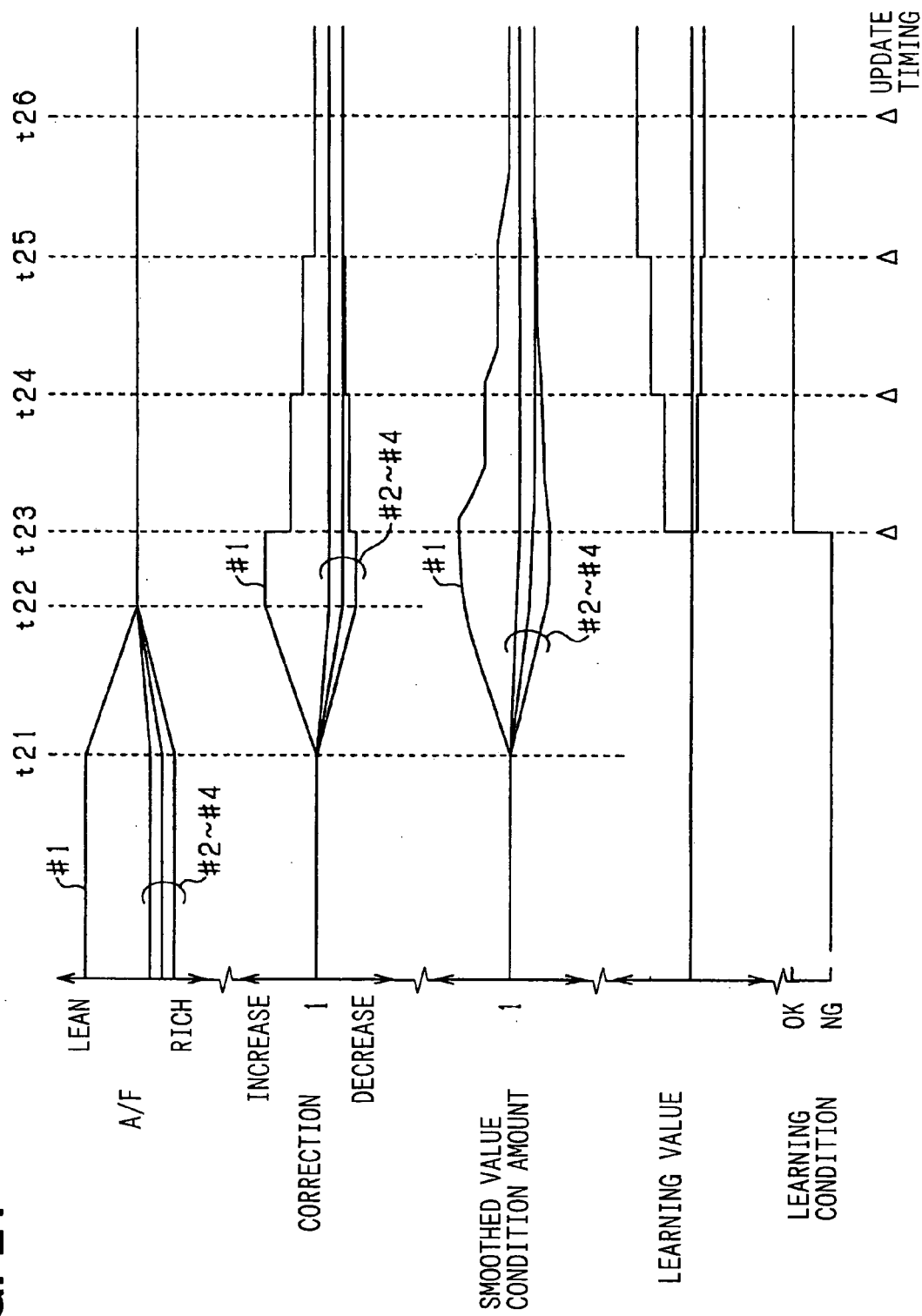
FIG. 21 is a time chart for explaining a process in which an individual cylinder learning value is updated.

FIG. 21 is a time chart for explaining a process in which the individual cylinder learning value is updated. In FIG. 21, only the individual cylinder air-fuel ratio of a first cylinder among four cylinders is apparently different from the other cylinders, and this is denoted by #1 in the drawing, and the others are denoted by #2 to #4.

In FIG. 21, subsequently to timing t21, the individual cylinder correction amount is calculated, and the individual cylinder correction amounts corresponding to the air-fuel ratio variations among the cylinders are calculated as shown in the drawing. At timing t22, the air-fuel ratio variations among the cylinders are removed, and the individual cylinder air-fuel ratios are almost uniformed.

Thereafter, at timing t23, the learning execution condition is established, and subsequently thereto, the calculation of the individual cylinder learning values and the update processing are performed. In the drawing, timings t23, t24, t25 and t26 are learning update timings. Since the learning update period is longer than the calculation period of the individual cylinder correction amount, erroneous learning due to abrupt update of the individual cylinder learning value is suppressed. At the respective timings of t23 to t26, the individual cylinder learning value is updated in proportion to the magnitude of the correction amount smoothed value of each of the cylinders in each case. When the correction amount smoothed value of each of the cylinders becomes less than the specified value THA, learning is regarded as being completed, and a learning completion flag is set (not shown). At this time, since the individual cylinder learning value is updated at the interval of the specified time, it is conceivable that the individual cylinder learning value can not sequentially deal with the individual cylinder variations, the variations among the cylinders are actually removed by the air-fuel ratio correction coefficient FAF and the like.

Figure 22:
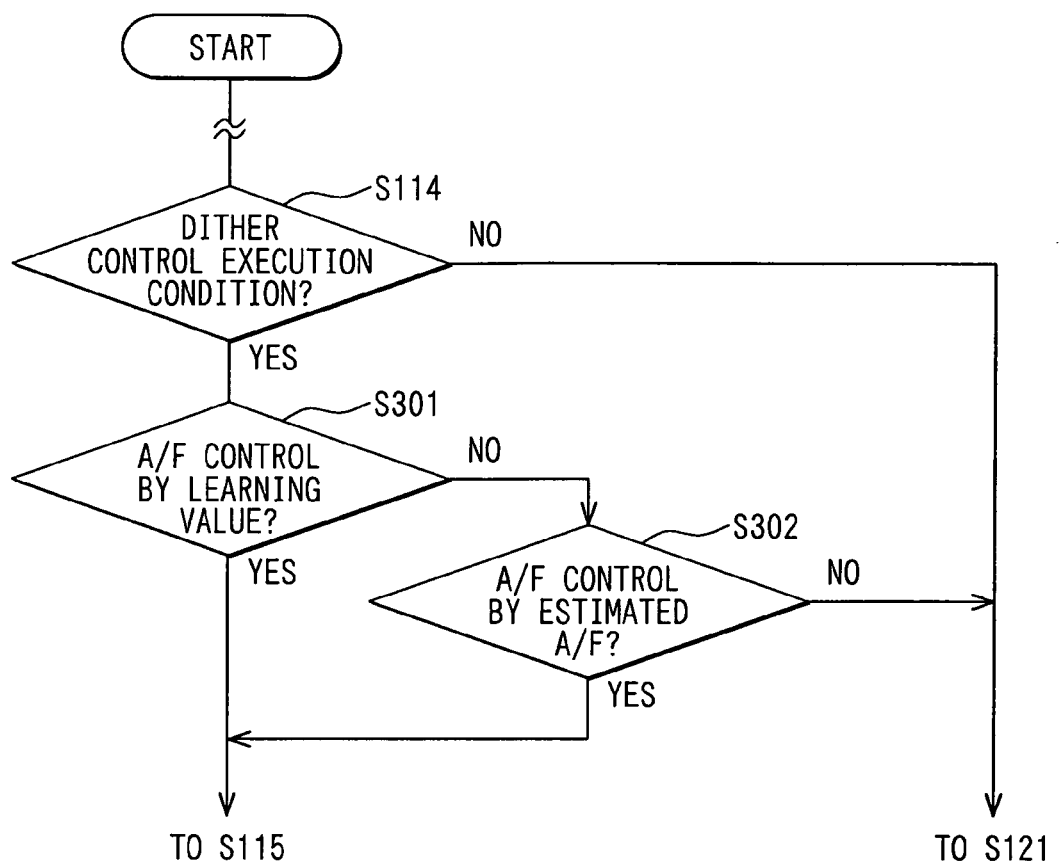
FIG. 22 is a flowchart showing a part of a calculation processing of air-fuel ratio dither control.

As described above, the individual cylinder air-fuel ratio control is performed, and in the state where the air-fuel ratio variations among the cylinders are removed by that (that is, in the state where the air-fuel ratios of the respective cylinders are uniformed), the air-fuel ratio dither control is performed. FIG. 22 is a flowchart showing an operation processing procedure of the air-fuel ratio dither control of this embodiment, and this processing is substituted for FIG. 9 and is performed. In FIG. 22, the illustration of the processes overlapping with those of FIG. 9 is omitted.

In FIG. 22, the execution condition judgment of the air-fuel ratio dither control at step S114 is performed as shown in FIG. 9, and in the case where the execution condition is established, the procedure proceeds to step S301. At step S301, with respect to the present operation area, it is determined whether the individual cylinder air-fuel ratio control by the individual cylinder learning value is performed. In the case where step S301 is NO, the individual cylinder air-fuel ratio is estimated at step S302, and it is determined whether the individual cylinder air-fuel ratio control is performed based on the estimated value of the individual cylinder air-fuel ratio. In summary, at step S301 and step S302, it is determined whether the air-fuel ratio variations among the cylinders are removed since the individual cylinder air-fuel ratio control is performed immediately after the engine start or the like.

Under the condition that either one of step S301 and S302 is YES, the processing subsequent to step S115 is executed. That is, the target λ is oscillated between the lean side and the rich side, and the air-fuel ratio dither control is performed. In this embodiment, the processing of step S301 and S302 correspond to "dither control permission means".

According to the second embodiment, since the air-fuel ratio dither control is performed in the state where the air-fuel ratios among the cylinders are uniformed, the air-fuel ratio can be oscillated as it is intended, and the improvement of the drivability and the early activation of the catalyst 31 can be realized more desirably.

Besides, since the individual cylinder learning value (air-fuel ratio learning value) is suitably calculated according to the individual cylinder correction amount for each cylinder, and is stored in the standby RAM or the like, even in the case where the estimated value of the individual cylinder air-fuel ratio can not be obtained, the individual cylinder air-fuel ratio control becomes possible, and the air-fuel ratio variations among the cylinders can be removed. For example, even before the activation of the air-fuel ratio sensor 32, it becomes possible to uniform the air-fuel ratios among the cylinders, and the air-fuel ratio dither control can be started early.

Since the update width (learning value update amount) of the individual cylinder learning value per update is variably set according to the individual cylinder correction amount in each case, even in the case where the individual cylinder correction amount is large (that is, the air-fuel ratio variations among the cylinders are large), learning can be completed in a relatively short time. Besides, in the case where the air-fuel ratio variations among the cylinders are resolved, and the individual cylinder correction amount becomes small, the individual cylinder learning value can be updated at small intervals, that is, carefully, so that the accuracy of the learning can be raised.

Since the individual cylinder air-fuel ratio is estimated by using the model configured based on the gas inflow and mixture in the exhaust collection part 24b, the individual cylinder air-fuel ratio reflecting the behavior of the gas exchange of the exhaust collection part 24b can be calculated. Since the model is the model (autoregressive model) for predicting the detected value of the air-fuel ratio sensor 32 from the past value, differently from the structure using a finite combustion history (combustion air-fuel ratio), it is not necessary to increase the history in order to improve the accuracy. As a result, the complexity of modeling is eliminated by using the simple model, and the individual cylinder air-fuel ratio can be calculated a thigh accuracy. As a result, the controllability of the air-fuel ratio control is improved.

Since the Kalman filter type observer is used for the estimation of the individual cylinder air-fuel ratio, performance against noise is improved, and the estimation accuracy of the individual cylinder air-fuel ratio is improved.

Since the control timing of the individual cylinder air-fuel ratio is variably set according to the engine load, the detected value of the air-fuel ratio sensor 32 can be acquired at an optimum timing, and the estimation accuracy of the individual cylinder air-fuel ratio is improved.

Incidentally, the present invention is not limited to the above embodiment, but may be carried out, for example, as follows.

In the above embodiment, the MBT time lean λ is guarded by the lean limit value, and the lean side amplitude value is calculated, and further, the most delayed angle time rich λ is guarded by the rich limit value, and the rich side amplitude value is calculated. However, the guard by the lean limit value and the rich limit value is not performed, and the MBT time lean λ and the most delayed angle time rich λ can be made the lean side amplitude value and the rich side amplitude value as they are. In the case where there is a margin for the lean limit value and the rich limit value, this structure becomes possible.

In the above embodiment, in order to delay the requested ignition timing with respect to the MBT, the reserve torque is added to increase the requested indicated torque, so that the requested air amount is forcibly increased. However, this is modified, and the requested air amount may be forcibly increased, or the requested throttle opening degree may be forcibly increased. In this case, the increase unit of the requested air amount and the increase unit of the requested throttle opening degree correspond to "air amount correction means". In summary, any structure of increasing the actual air amount may be adopted.

Besides, on the premise that the base ignition timing is made the MBT, the requested indicated torque is corrected to be increased by the addition of the reserve torque, and consequently, the ignition timing is delayed. However, in the case where the base ignition timing is made one other than the MBT, for example, in the case where it is made the spark timing retard limit, the structure may be such that the requested indicated torque is corrected to be decreased, and consequently, the ignition timing is advanced. In summary, the room for operation of the ignition timing at the spark timing retard side and the advance angle side in the air-fuel ratio dither control has only to be secured.

In the above embodiment, as the air-fuel ratio dither control, the air-fuel ratio is oscillated between the lean side and the rich side for every combustion of each cylinder. However, the air-fuel ratio may be oscillated between the lean side and the rich side for every plural combustions. Besides, the air-fuel ratio may be oscillated between the lean side and the rich side for every cycle (720°CA).

In the second embodiment, it is determined (1) whether the individual cylinder air-fuel ratio control is performed with the individual cylinder learning value, or (2) whether the individual cylinder air-fuel ratio control is performed based on the estimated value of the individual cylinder air-fuel ratio. In the case where either one is satisfied, it is determined that the air-fuel ratio variations among the cylinders are removed. However, this may be determined by only (1) or (2). Specifically, either one of step S301 and step S302 in FIG. 22 is omitted.

In the second embodiment, although the individual cylinder air-fuel ratio is estimated by using the model configured based on the gas inflow and mixture in the exhaust collection part 24b, the calculation method of the individual cylinder air-fuel ratio may be changed to another. In summary, any method can be applied as long as the individual cylinder air-fuel ratio reflecting variations among the cylinders due to the shape of the intake manifold, the operation of the intake valve, the individual difference of the fuel injection device and the like can be calculated.

In addition to the object of the catalyst activation at the time of engine start, the air-fuel ratio dither control of the invention may be performed, for example, in the case where the responsibility of the air-fuel ratio sensor 32 is detected, and the deterioration judgment or the like is performed from the detected responsibility. Specifically, the target λ is oscillated in the air-fuel ratio dither control between the rich side and the lean side by a specified amount, and based on the response amount of the sensor detected value at that time, the existence of deterioration of the air-fuel ratio sensor, the degree of deterioration, and the like are determined. Also in such a case, the air-fuel ratio can be excellently oscillated without causing the deterioration of drivability or the like.

What is claimed is:

1. A control device of an internal combustion engine in which a target base air-fuel ratio is set, and air-fuel ratio dither control is performed by oscillating an air-fuel ratio between a lean side and a rich side with respect to the target base air-fuel ratio, the control device comprising:

requested torque calculation means for calculating a requested torque to be generated by combustion of the internal combustion engine based on an accelerator opening degree operated by a driver;

MBT estimated torque calculation means for calculating an MBT estimated torque corresponding to minimum advance for the best torque (MBT) in each case;

spark timing retard limit estimated torque calculation means for calculating a spark timing retard limit estimation torque corresponding to a spark timing retard limit in each case; and air-fuel ratio amplitude amount calculation means for calculating an air-fuel ratio amplitude amount in the air-fuel ratio dither control based on the calculated requested torque, the MBT estimated torque and the spark timing retard limit estimated torque.

2. A control device of an internal combustion engine according to claim 1, wherein:
the air-fuel ratio amplitude amount calculation means calculates air-fuel ratio amplitude amounts at the lean side and at the rich side based on a torque ratio of the requested torque to the MBT estimated torque, and a torque ratio of the requested torque to the spark timing retard limit estimated torque.

3. A control device of an internal combustion engine according to claim 1, further comprising:
means for calculating an MBT lean air-fuel ratio corresponding to the MBT based on a torque ratio of the requested torque to the MBT estimated torque; and
means for calculating a spark timing retard limit rich air-fuel ratio corresponding to a spark timing retard limit based on a torque ratio of the requested torque to the spark timing retard limit estimated torque,
wherein the air-fuel ratio amplitude amount calculation means calculates the air-fuel ratio amplitude amounts at the lean side and at the rich side based on the calculated MBT lean air-fuel ratio and the spark timing retard limit rich air-fuel ratio.

4. A control device of an internal combustion engine according to claim 3,
wherein the MBT lean air-fuel ratio and the spark timing retard limit rich air-fuel ratio are calculated by using a torque efficiency characteristic in which a relation between an air-fuel ratio and a torque efficiency is previously regulated.

5. A control device of an internal combustion engine according to claim 3,
wherein a lean limit value and a rich limit value are previously regulated in conformity to a combustion state of the internal combustion engine, the air-fuel ratio amplitude amount calculation means limits the MBT lean air-fuel ratio by the lean limit value, and limits the spark timing retard limit rich air-fuel ratio by the rich limit value.

6. A control device of an internal combustion engine according to claim 3,
wherein the air-fuel ratio amplitude amount calculation means calculates an air-fuel ratio amplitude amount common to the lean side and the rich side based on one of the MBT lean air-fuel ratio and the spark timing retard limit rich air-fuel ratio closer to the target base air-fuel ratio.

7. A control device of an internal combustion engine according to claim 1,
wherein the requested torque, the MBT estimated torque and the spark timing retard limit estimated torque are calculated by using a torque efficiency characteristic in which a relation between an air-fuel ratio and a torque efficiency is previously regulated, and the control device further comprises means for previously shifting the target base air-fuel ratio to the lean side when the target base air-fuel ratio in the air-fuel ratio dither control is made a stoichiometric air-fuel ratio or a value in the vicinity thereof.

8. A control device of an internal combustion engine according to claim 1, further comprising:
air amount control means for controlling the amount of air sucked into the internal combustion engine based on a requested air amount requested by the driver;
ignition timing control means for controlling an ignition timing to an advance angle side or a spark timing retard side by an actual torque calculated based on an actual air amount in each case and the requested torque; and
air amount correction means for making an increase/decrease correction of the requested air amount, wherein air amount control is performed based on the requested air amount after the increase/decrease correction.

9. A control device of an internal combustion engine according to claim 8,
wherein the air amount correction means makes a correction to increase the requested air amount when a base ignition timing is made the MBT or a timing in the vicinity thereof.

10. A control device of an internal combustion engine according to claim 8,
wherein the air amount control means calculates the requested air amount based on a requested torque in each case, and the air amount correction means makes the increase/decrease correction of the requested air amount by increasing/decreasing the requested torque.

11. A control device of an internal combustion engine according to claim 1, further comprising actual torque estimation means for estimating an actual torque in each case, wherein torque control is performed based on the estimated actual torque and the requested torque, and the control device further comprises:
actual air-fuel ratio estimation means for estimating a behavior of an actual air-fuel ratio during the air-fuel ratio dither control; and
actual torque correction means for correcting the actual torque based on the estimated actual air-fuel ratio.

12. A control device of an internal combustion engine according to claim 11,
wherein the actual air-fuel ratio estimation means estimates the actual air-fuel ratio by performing a smoothing operation of a final target air-fuel ratio after the target base air-fuel ratio is corrected by the air-fuel ratio amplitude amount.

13. A control device of an internal combustion engine according to claim 1, comprising an air-fuel ratio sensor provided at a collection part of an exhaust passage communicating with respective cylinders of a multi-cylinder internal combustion engine, wherein the control device performs air-fuel ratio feedback control to cause a sensor detected value of the air-fuel ratio sensor to coincide with a target value and further comprises:
individual cylinder air-fuel ratio calculation means for calculating an individual cylinder air-fuel ratio based on the sensor detected value of the air-fuel ratio sensor;
individual cylinder air-fuel ratio control means for calculating an individual cylinder correction amount, which reflects air-fuel ratio variance between the cylinders, for each of the cylinders based on the calculated individual cylinder air-fuel ratio, and for controlling the air-fuel ratio for each of the cylinders by the individual cylinder correction amount; and
dither control permission means for permitting practice of the air-fuel ratio dither control under a condition that the individual cylinder air-fuel ratio control is performed.

14. A control device of an internal combustion engine according to claim 13,
wherein the individual cylinder air-fuel ratio control means calculates an average value of the individual cylinder air-fuel ratios of all cylinders as detection objects of the air-fuel ratio sensor, calculates an air-fuel ratio variation amount between the cylinders from a difference between the average value and the individual cylinder air-fuel ratio, and calculates the individual cylinder correction amount according to the air-fuel ratio variation amount.

15. A control device of an internal combustion engine according to claim 13,
wherein the individual cylinder air-fuel ratio control means calculates an average value of the individual cylinder correction amounts of all the cylinders, and makes a correction to decrease the individual cylinder correction amount of each of the cylinders by the average value of all the cylinders.

16. A control device of an internal combustion engine according to claim 13, further comprising learning means for calculating an air-fuel ratio learning value for each of the cylinders according to the individual cylinder correction amount under a state where the individual cylinder air-fuel ratio control is performed by the individual cylinder air-fuel ratio control means, and for storing the air-fuel ratio learning value into a backup memory,
wherein the dither control permission means permits the practice of the air-fuel ratio dither control under a condition that learning of the air-fuel ratio learning value is completed.

17. A control device of an internal combustion engine according to claim 16,
wherein the learning means divides an operation area of the internal combustion engine into plural areas, calculates the air-fuel ratio learning value for each of the divided areas, and stores it into the backup memory.

18. A control device of an internal combustion engine according to claim 16,
wherein the learning means updates the air-fuel ratio learning value only in a case where the individual cylinder correction amount is more than a specified value.

19. A control device of an internal combustion engine according to claim 18,
wherein a value corresponding to a case where a difference between an average value of the estimated individual cylinder air-fuel ratios of all cylinders as detection objects of the air-fuel ratio sensor and the individual cylinder air-fuel ratio is more than 0.01 in lambda ($\lambda$) is made the specified value.

20. A control device of an internal combustion engine according to claim 18,
wherein the learning means determines an update width of the air-fuel ratio learning value per update according to the individual cylinder correction amount in each case, and updates the air-fuel ratio learning value by the update width.

21. A control device of an internal combustion engine according to claim 6,
wherein an update period of the air-fuel ratio learning value is made longer than a calculation period of the individual cylinder correction amount.

22. A control device of an internal combustion engine according to claim 16, further comprising means for causing the individual cylinder air-fuel ratio control to reflect the air-fuel ratio learning value stored in the backup memory each time fuel is injected to each of the cylinders.

23. A control device of an internal combustion engine according to claim 13,
wherein the individual cylinder air-fuel ratio calculation means forms a model in which the sensor detected value of the air-fuel ratio sensor is obtained by multiplying a history of the individual cylinder air-fuel ratio of inflow gas in an exhaust collection part and a history of the sensor detected value by specified weights respectively and by adding them, and estimates the individual cylinder air-fuel ratio based on the model.

24. A control device of an internal combustion engine according to claim 23,
wherein the model is configured by considering a first order delay element of gas inflow and mixture in the exhaust collection part and a first order delay element by response of the air-fuel ratio sensor.

25. A control device of an internal combustion engine according to claim 23,
wherein a Kalman filter type observer is used and estimation of the individual cylinder air-fuel ratio is performed by the observer.

26. A control device of an internal combustion engine according to claim 13,
wherein a calculation condition of the individual cylinder air-fuel ratio is determined based on a state of the air-fuel ratio sensor or an operation state of the internal combustion engine, and calculation of the individual cylinder air-fuel ratio is performed at a time when the calculation condition is satisfied.

* * * * *